US008821279B2

(12) United States Patent
Yoshikawa

(10) Patent No.: US 8,821,279 B2
(45) Date of Patent: Sep. 2, 2014

(54) GAME SERVER, GAME CONTROLLING METHOD THEREOF, NON-TRANSITORY COMPUTER-READABLE MEDIUM AND GAME SYSTEM

(71) Applicant: gloops, Inc., Tokyo (JP)

(72) Inventor: Isao Yoshikawa, Tokyo (JP)

(73) Assignee: gloops, Inc., Tokyo (JP)

( * ) Notice: Subject to any disclaimer, the term of this patent is extended or adjusted under 35 U.S.C. 154(b) by 0 days.

(21) Appl. No.: 13/970,431

(22) Filed: Aug. 19, 2013

(65) Prior Publication Data

US 2014/0057717 A1  Feb. 27, 2014

(30) Foreign Application Priority Data

Aug. 20, 2012  (JP) .................................. 2012-181868

(51) Int. Cl.
*A63F 13/12*  (2006.01)

(52) U.S. Cl.
CPC ...................................... *A63F 13/12* (2013.01)
USPC .............................................. 463/31; 463/42

(58) Field of Classification Search
USPC ....................................................... 463/31, 42
See application file for complete search history.

(56) References Cited

U.S. PATENT DOCUMENTS

| | | | | |
|---|---|---|---|---|
| 4,240,638 A | * | 12/1980 | Morrison et al. ................ | 463/15 |
| 4,410,181 A | * | 10/1983 | Lapp et al. ..................... | 273/238 |
| 5,050,883 A | * | 9/1991 | Goldfarb et al. ................ | 463/15 |
| 5,616,079 A | * | 4/1997 | Iwase et al. ..................... | 463/32 |
| 6,007,423 A | * | 12/1999 | Nakamura ........................ | 463/6 |
| 6,123,619 A | * | 9/2000 | Tokita et al. .................... | 463/43 |
| 6,133,923 A | * | 10/2000 | Ozawa ........................... | 345/582 |
| 6,213,878 B1 | * | 4/2001 | Setsumasa et al. ............. | 463/31 |
| 6,319,129 B1 | * | 11/2001 | Igarashi et al. ................. | 463/31 |
| 6,371,856 B1 | * | 4/2002 | Niwa .............................. | 463/43 |

(Continued)

FOREIGN PATENT DOCUMENTS

| | | | | |
|---|---|---|---|---|
| GB | 2290720 A | * | 1/1996 | |
| GB | 2437664 A | * | 10/2007 | .............. G07F 17/32 |

(Continued)

OTHER PUBLICATIONS

Japanese Patent Application No. 2012-181868: Office Action dated Jan. 30, 2013, 5 pages.
Japanese Patent Application No. 2012-181868: Office Action dated Apr. 15, 2013, 8 pages.
Japanese Patent Application No. 2012-181868: Decision to Grant a Patent dated Jun. 17, 2013, 4 pages.
"From TV Animation One Piece, Become the Pirate King!" Pirates Bible, Japan, Shueisha Inc., Aug. 1, 2000, 6 pages.
"Monster Hunter Exploration Journal: Phantom Island, Dengeki Game Appli, Japan", Ascii Media Works, Feb. 14, 2012, 5 pages.

*Primary Examiner* — William Brewster
*Assistant Examiner* — Jason Skaarup
(74) *Attorney, Agent, or Firm* — Baker & Hostetler LLP

(57) ABSTRACT

A game server includes a storage that stores information representing a virtual space having two-dimensionally arranged virtual positions where virtual users can exist, a map-creating section creating a two-dimensional map by connecting a route between the virtual positions, a table that stores identification data of a virtual user existing at each virtual position, a data-transmitting section transmitting two-dimensional-map-image data to a network-connected terminal, a data-receiving section receiving operation data from the terminal, a position-changing section changing the virtual position of the virtual user to a destination virtual position when accumulated points become or exceeds required points, and a data-updating section updating the identification data when the virtual position of the virtual user is changed. The two-dimensional map includes various types of pieces having a route from one edge to another edge of a polygon obtained by dividing the two-dimensional map and formed by combining the pieces to connect the routes.

12 Claims, 19 Drawing Sheets

(56) References Cited

U.S. PATENT DOCUMENTS

| | | | |
|---|---|---|---|
| 6,656,051 B2 * | 12/2003 | Ishii et al. | 463/43 |
| 6,755,745 B1 * | 6/2004 | Seto et al. | 463/43 |
| 7,670,225 B2 * | 3/2010 | Nishimura | 463/30 |
| 8,202,147 B2 * | 6/2012 | Yamada et al. | 463/1 |
| 2003/0058238 A1 * | 3/2003 | Doak et al. | 345/419 |
| 2004/0224759 A1 | 11/2004 | Nishimura | |
| 2004/0254019 A1 * | 12/2004 | Riendeau et al. | 463/42 |
| 2010/0216538 A1 * | 8/2010 | Lind | 463/19 |
| 2012/0064969 A1 | 3/2012 | Uchibori | |
| 2012/0252577 A1 * | 10/2012 | Webster | 463/31 |
| 2013/0116046 A1 * | 5/2013 | Manton et al. | 463/31 |
| 2013/0344953 A1 * | 12/2013 | Yoshikawa | 463/29 |

FOREIGN PATENT DOCUMENTS

| | | |
|---|---|---|
| JP | 11-144087 | 5/1999 |
| JP | 2004-329697 | 11/2004 |
| JP | 2012-024248 | 2/2012 |
| JP | 2012-061060 | 3/2012 |

* cited by examiner

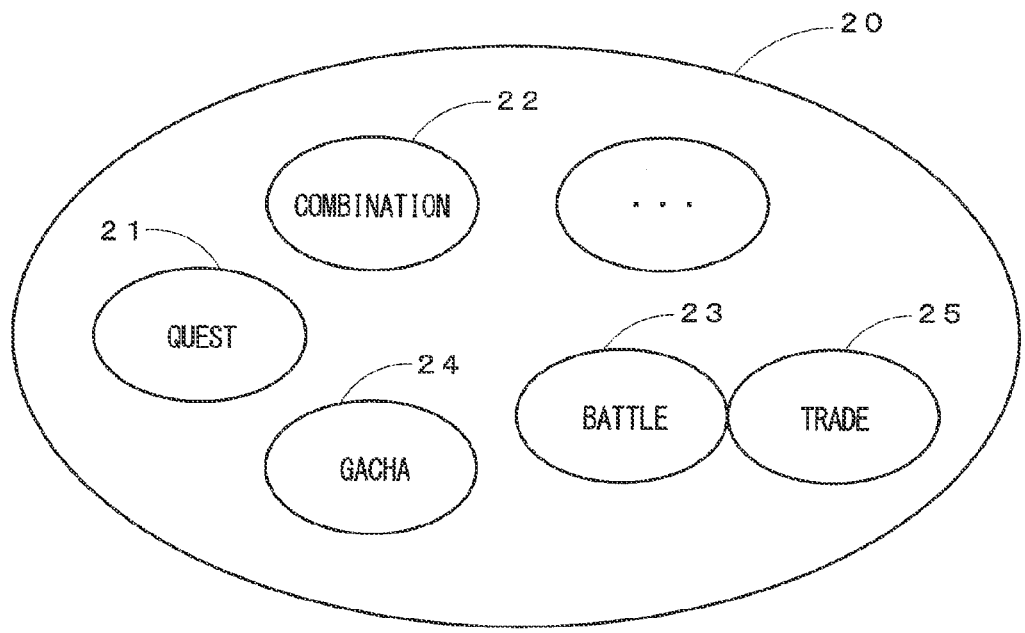
F I G. 2
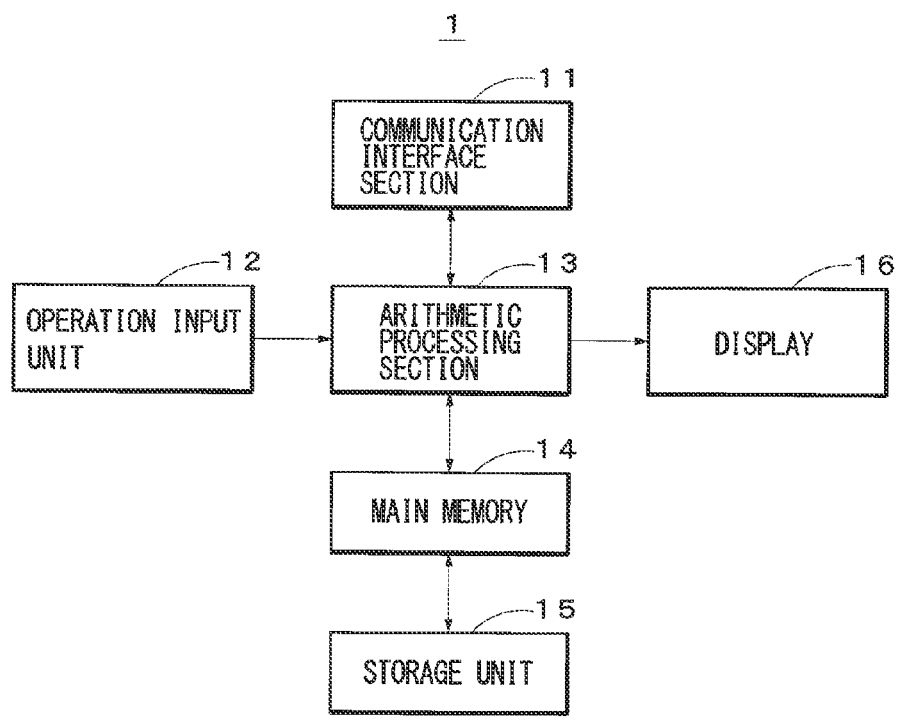
F I G. 3

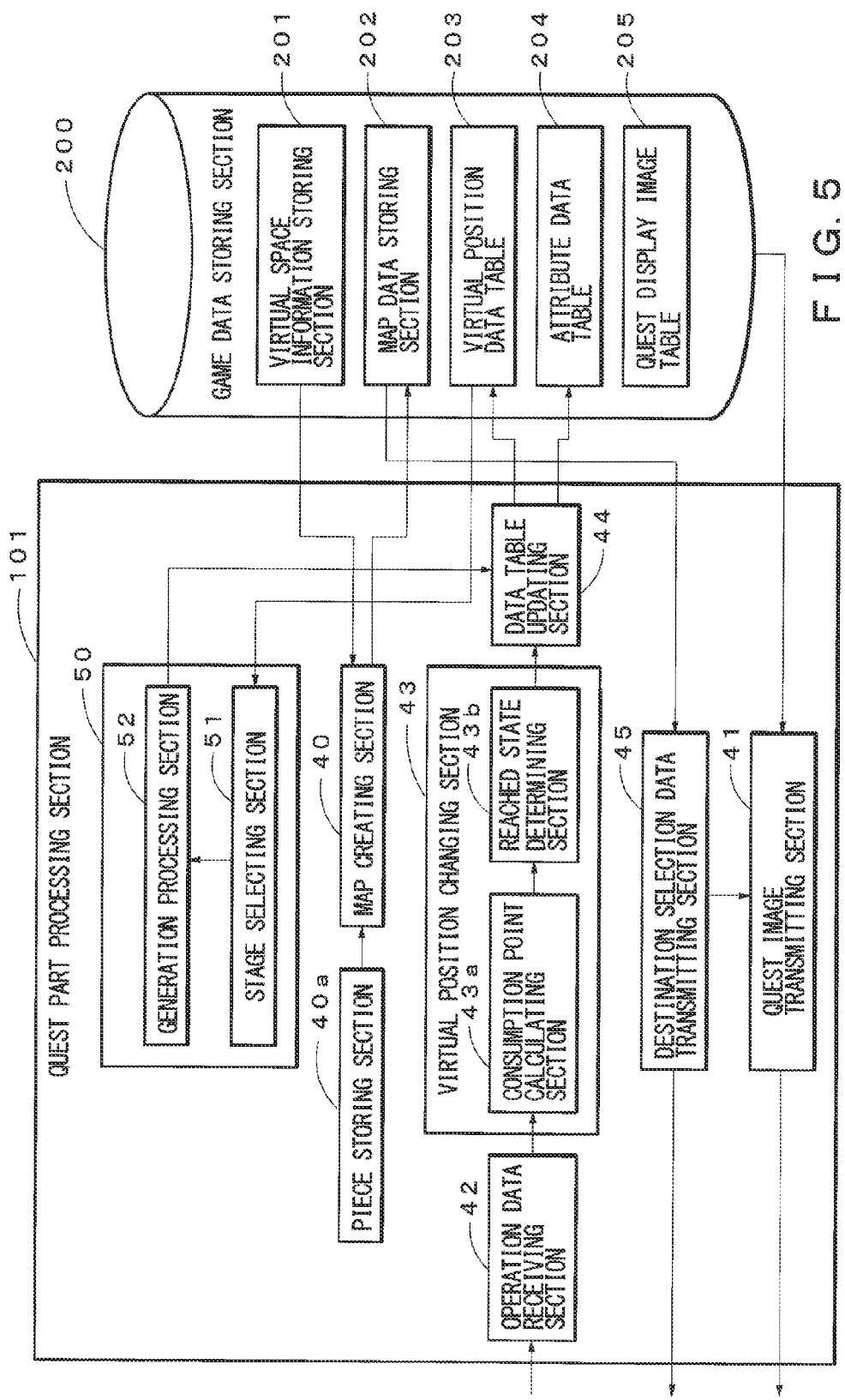
F I G. 5

| STAGE NUMBER | REACHABLE STAGE | REACHABLE STAGE | REACHABLE STAGE | REACHABLE STAGE | EVENT DATA |
|---|---|---|---|---|---|
| St(1,1) | St(2,1) (15) | | | | QUEST POINT RECOVERY ITEM |
| St(1,2) | St(1,1) (20) | | | | |
| ⋮ | | | | | |
| St(2,1) | St(2,2) (23) | | | | |
| St(2,2) | St(2,3) (20) | St(3,2) (15) | | | |
| ⋮ | | | | | |
| St(3,1) | | | | | BATTLE POINT RECOVERY ITEM |
| St(3,2) | St(3,1) (10) | St(3,3) (25) | St(4,2) (35) | | |
| ⋮ | | | | | |

| FIELD NUMBER | STAGE NUMBER | ID | ID | ID | ID | ... | ID |
|---|---|---|---|---|---|---|---|
| F(1) | St(1, 1) | 10008 | | | | | |
| F(1) | St(1, 2) | 10125 | 10141 | 10356 | | | |
| F(1) | St(1, 4) | | | | | | |
| F(1) | St(2, 1) | 10563 | 10748 | 14531 | 17425 | | |
| F(1) | St(2, 2) | 11134 | 14375 | | | | |
| F(1) | St(2, 3) | 10005 | 10007 | | | | |
| F(1) | St(2, 4) | 12571 | | | | | |
| ... | ... | | | | | | |

| ID | POSITION INFORMATION | LEVEL INFORMATION | QUEST POINT | BATTLE POINT | GACHA POINT | OBTAINED CARD LIST |
|---|---|---|---|---|---|---|
| 10001 | F(3)St(2,1) | L6 | 70 | 120 | 290 | |
| 10002 | F(5)St(1,1) | L3 | 30 | 50 | 125 | |
| 10003 | F(7)St(3,1) | L9 | 110 | 70 | 450 | |
| 10004 | F(2)St(1,1) | L2 | 30 | 45 | 50 | |
| 10005 | F(1)St(2,2) | L1 | 20 | 30 | 20 | |
| 10006 | F(2)St(3,4) | L3 | 50 | 40 | 40 | |
| 10007 | F(1)St(2,1) | L1 | 20 | 30 | 60 | |
| 10008 | F(1)St(3,3) | L1 | 25 | 30 | 45 | |

204

F I G . 9

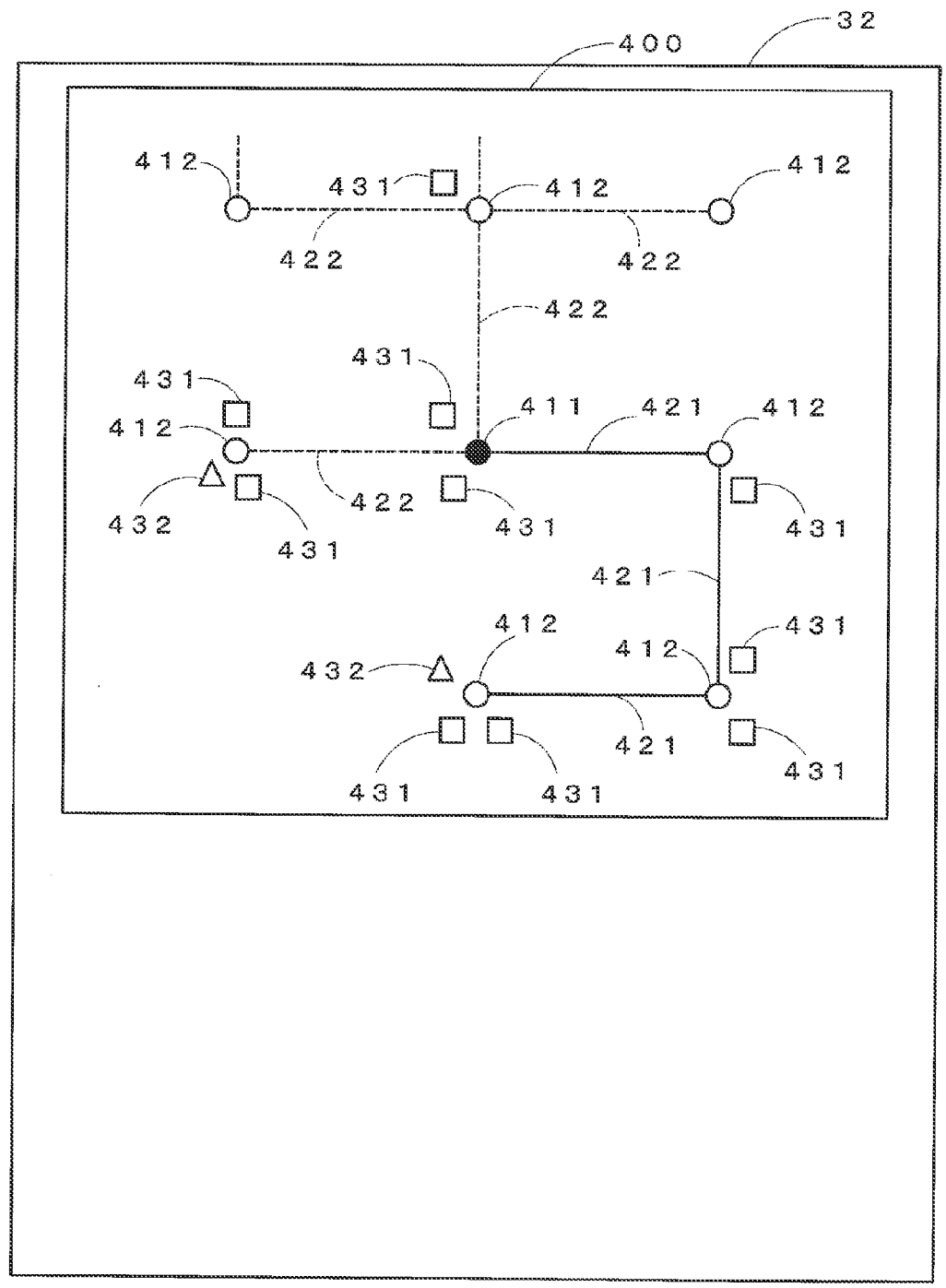
F I G. 10

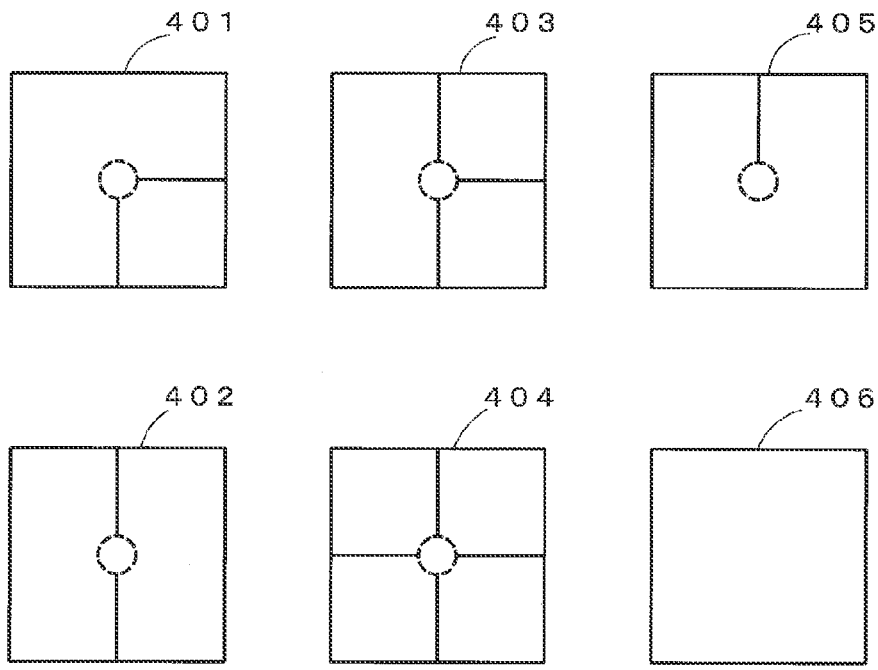
F I G. 11
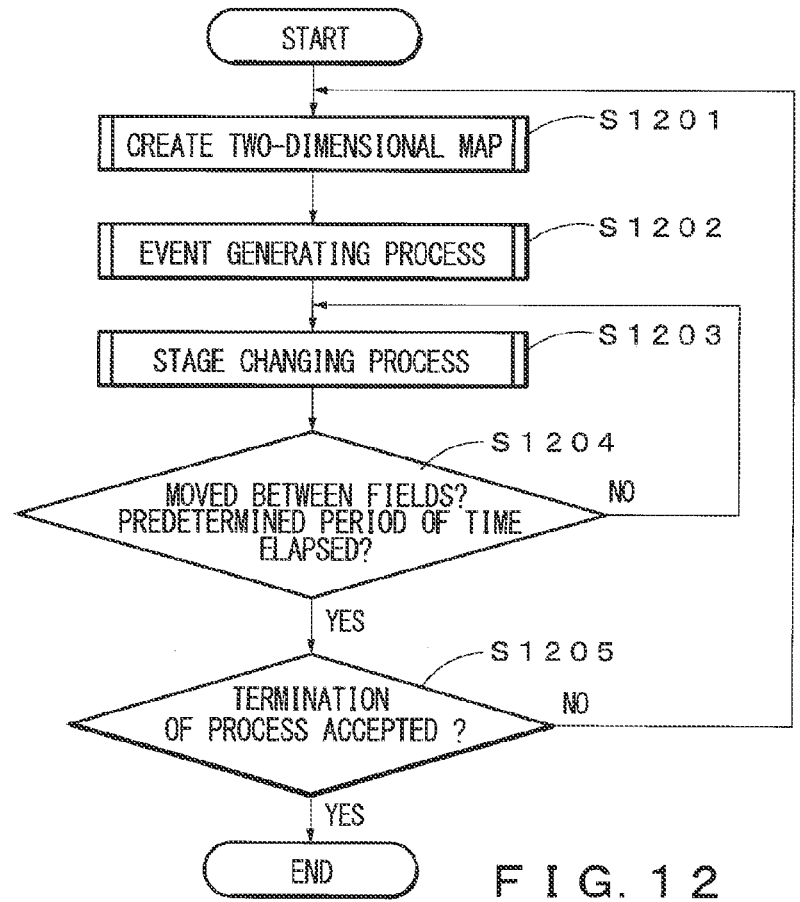
F I G. 12

| STAGE NUMBER | REACHABLE STAGE | REACHABLE STAGE | REACHABLE STAGE | REACHABLE STAGE | EVENT DATA |
|---|---|---|---|---|---|
| St(1,1) | St(1,2) (25) | St(2,1) (15) | | | |
| St(1,2) | St(1,1) (25) | St(2,2) (25) | | | |
| ⋮ | | | | | |
| St(2,1) | St(1,1) (15) | St(3,1) (23) | | | QUEST POINT RECOVERY ITEM |
| St(2,2) | St(1,2) (25) | St(2,3) (25) | St(3,2) (15) | | |
| ⋮ | | | | | |
| St(3,1) | St(2,1) (23) | St(3,2) (15) | | | RARE CARD GACHA TICKET |
| St(3,2) | St(2,2) (15) | St(3,1) (10) | St(4,2) (25) | | |
| ⋮ | | | | | |

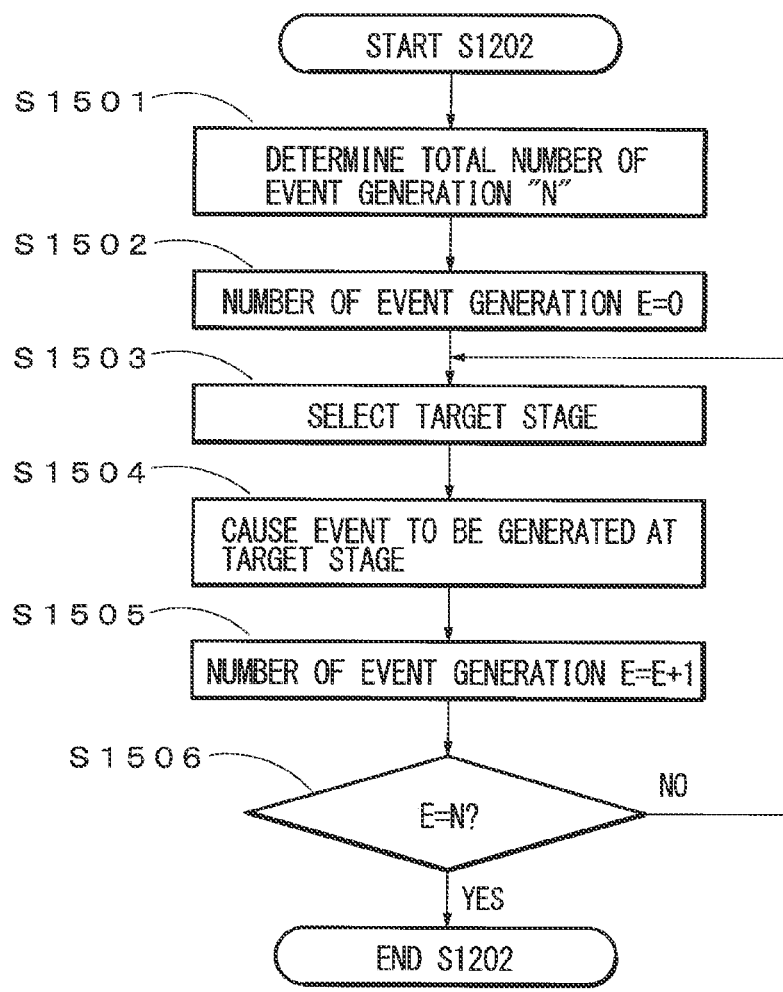
F I G. 15

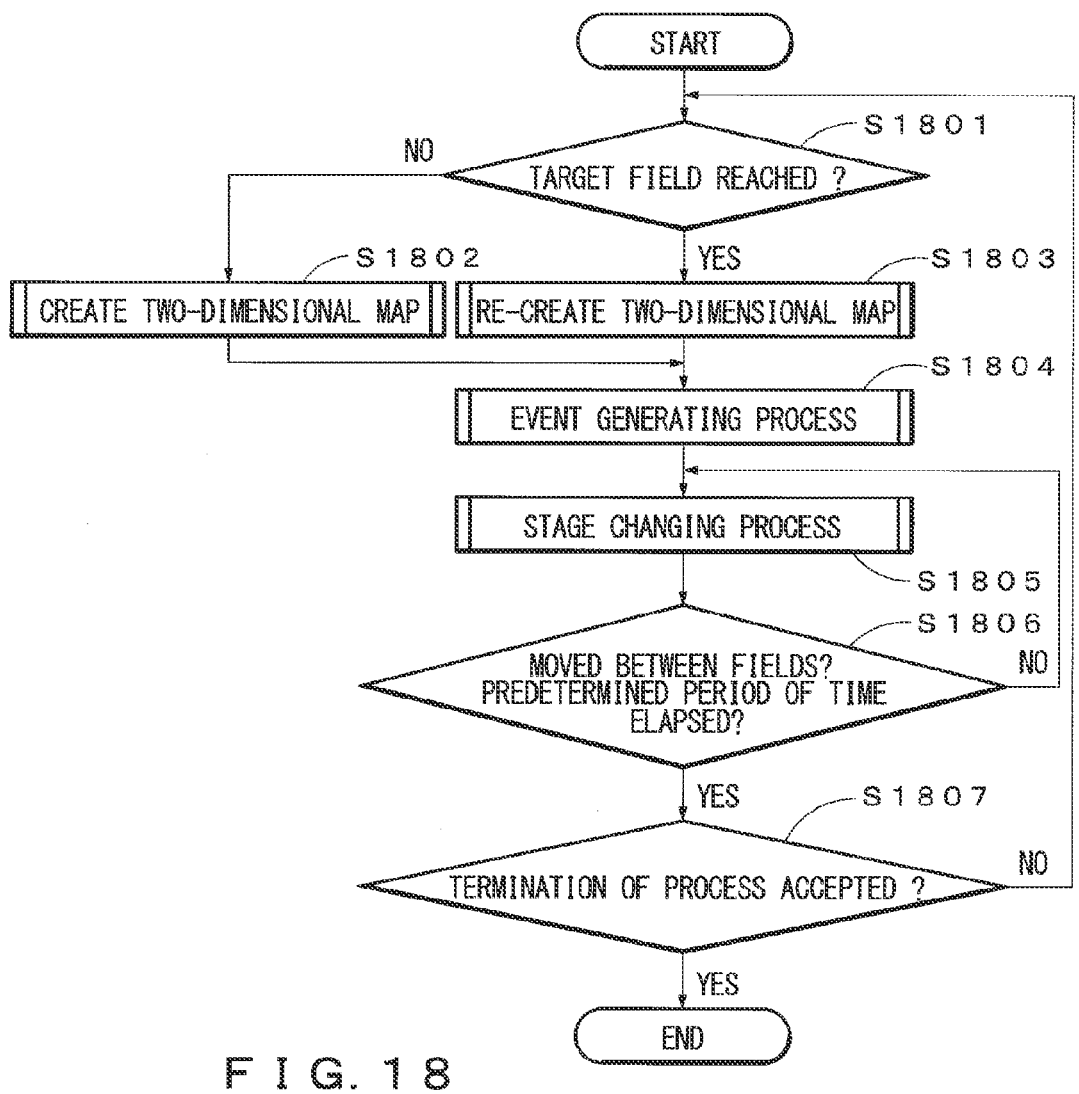
F I G. 18

GAME SERVER, GAME CONTROLLING METHOD THEREOF, NON-TRANSITORY COMPUTER-READABLE MEDIUM AND GAME SYSTEM

CROSS REFERENCE TO RELATED APPLICATIONS

This application claims the benefit of Japanese Patent Application No. 2012-181868 filed Aug. 20, 2012, which is hereby incorporated by reference in its entirety.

TECHNICAL FIELD

The present disclosure relates to a game server that manages an action of a virtual user existing in a virtual space using operation data from at least one terminal connected via a communication network, a method of controlling a game, a non-transitory computer-readable medium and a game system.

BACKGROUND ART

Recently, social network games (hereinafter referred to as social games), which are games provided using a Social Networking Service (SNS), are becoming more common with the spread of high-end portable terminals such as smartphones. A social game is a game in which a physical user operating a terminal controls, via a communication network, a virtual user that exists in a virtual space established by a game server to play a game online while communicating with other virtual users existing in the same virtual space.

For example, one of such types of social games may be a game in which, depending on an action of the virtual user or a story, a single story or scenario is established by combining a plurality of game parts such as a quest part, a battle part, a combination part, and a gacha part to constitute a single game. The quest part may be a game part in which the virtual user acting in response to the operation of the terminal by the physical user sequentially completes events assigned to the virtual user in a quest including a battle or a mission (e.g., see Japanese Laid-Open Patent Publication No. 2012-24248).

Japanese Laid-Open Patent Publication No. 2012-24248 discloses that when a quest part, which is one of the game parts, is selected, the virtual user therein linearly selects and completes the events assigned to the virtual user in the relevant quest in a predetermined order.

Japanese Laid-Open Patent Publication No. 2012-24248 discloses that, when a quest part constituting a part of the game is selected, the virtual user in the quest part basically selects and completes the events assigned to the virtual user linearly in a predetermined order. Therefore, play in the quest part is limited to the selection of a "next" or "advance" button or a "return" or "retreat" button, and the physical user does not have a free choice of action over the virtual user.

The quest part of the related art is configured in such a manner that a plurality of virtual positions are arranged on a linear single path or arranged one-dimensionally, and each virtual user exists at each virtual position. Accordingly, the virtual user merely has an option of proceeding or returning along the single path with each virtual position being a base point. Therefore, since actions assigned to a virtual user are merely performed sequentially, a user operation of the terminal is limited to pressing down a button displayed on the terminal in accordance with an instruction from a server and thus the operation was repetitive. As has been described above, since the movement is along a single path and thus there is no change in the path of the movement, the user's feeling of enjoyment of an entire game including the quest part was decreased.

The present disclosure has been contrived based on the aforementioned disadvantages and it is an object of the present disclosure to provide a game server that can stimulate interest in the entire game by providing a variation in the travel path of a virtual user existing in a virtual space, a method of controlling a progress of a game provided by the game server, a non-transitory computer-readable medium and a game system.

SUMMARY

The game server disclosed herein includes a virtual space information storing section that stores virtual space information representing a virtual space in which at least one virtual position where a virtual user can exist is arranged two-dimensionally, a map creating section that creates a two-dimensional map by connecting each of the virtual positions located in the virtual space represented by the virtual space information, a virtual position data table that stores identification data of a virtual user existing at each of the virtual positions, a display process data transmitting section that transmits display process data for displaying an image of the two-dimensional map to at least one terminal connected via a communication network, an operation data receiving section that receives operation data from the terminal, a virtual user position changing section that changes the virtual position where the virtual user exists to the virtual position of the destination when accumulated points consumed in accordance with a received content of the operation data is greater than or equal to points required for reaching a virtual position of a destination and a data updating section that updates identification data existing at each of the virtual positions stored in the virtual position data table when the virtual position where the virtual user exists is changed, the two-dimensional map created by the map creating section is formed by a plurality of types of polygon pieces provided with a route extending from one edge of a polygon to at least one of the other edges of the polygon obtained by dividing the two-dimensional map, the two-dimensional map being formed by combining the plurality of types of pieces in such a manner that the routes on the pieces are connected.

In the above-mentioned embodiment, the virtual position where a virtual user can exist is located two-dimensionally and stored as map data in the map data storing section, and this can be displayed on the terminal as an image of a two-dimensional map.

Thereby, when executing an action assigned to the virtual user at each virtual position, a plurality of virtual positions reachable by the virtual user can be provided.

Since the physical user can recognize the plurality of destinations by looking at the two-dimensional map on the terminal, a virtual region provided by the game part can be visually broadened as compared to the related art in which merely linear advancement was possible.

Further, with the aforementioned embodiment, a two-dimensional map is formed by connecting a route from one edge of a polygon to at least one of the other edges of the polygon to combine a plurality of types of pieces (also referred to as connecting pieces) dividing the two-dimensional map of the virtual space.

According to such a present disclosure, even if the virtual user is existing in the same virtual space, a route between the virtual positions reachable by the virtual user can be varied by forming a two-dimensional map by combining the pieces to connect a route between the virtual positions.

In this manner, according to the present disclosure, various impressions of the virtual space in which a virtual user exists can be given to a physical user, and, as a result, an interest in the game as a whole can be stimulated.

Particularly, since the physical user can recognize the plurality of destinations by looking at the two-dimensional map on the terminal, a virtual region provided by the game part can be visually broadened as compared to the related art in which merely linear advancement was possible.

In any of the embodiments described above, the game server of the present disclosure can be deemed to relate to a control method, a non-transitory computer-readable storage medium or a game system.

In a preferred embodiment of a game server of the present disclosure, the virtual space is divided into a plurality of layers, one of the layers being connected in such a manner that the virtual user is movable to at least one of the other layers, and the map creating section creates the two-dimensional map by combining the pieces to connect a route between the virtual position located on a destination layer when the virtual user moves between the layers.

In the aforementioned embodiment, since the map creating section creates a two-dimensional map by connecting a route between the virtual positions placed in the destination layer, a layer with a different path of movement as compared to the layer before the movement can be visually recognized by the physical user for every movement between the layers. Also, when the virtual user has returned to the layer already arrived at in the past, the virtual user can move in the virtual space in which a path of movement different from that of the past is created. Thereby, a variety of impressions can be given to a physical user concerning the virtual space in which the virtual user exists.

In a preferred embodiment of a game server of the present disclosure, the map creating section creates a two-dimensional map of the destination layer by maintaining a route connecting virtual positions which the virtual user has not passed through in a destination layer and by combining the pieces to connect virtual positions the virtual user has already passed through.

In the aforementioned embodiment, when the virtual user has come back to the field where the virtual user has arrived at in the past, a connection relationship between the virtual positions that have not been reached by the virtual user on the field can be maintained. For example, when there is an unreached area on a layer, a virtual user may be planning to progress the game by proceeding to another layer for a period of time and later coming back to the relevant layer and completing the unreached area. Such a plan can be accomplished, since a previous state is maintained for the route which has been passed through.

In a preferred embodiment of a game server of the present disclosure, the piece is a connecting piece that has a rectangular geometry dividing the virtual space equally in a matrix-like manner, the connecting piece including a route extending from one edge of the rectangle to at least one of the other edges of the rectangle.

In the aforementioned embodiment, by using a rectangular connecting piece dividing the virtual space equally in a matrix-like manner, the route between virtual positions can be easily divided and connected when creating a two-dimensional map.

According to an aspect of the present disclosure, by creating a two-dimensional map by combining pieces to connect the route between virtual positions, even if the virtual user exists in the same virtual space, a route between the virtual positions reachable by the virtual user can be changed, and thus various impressions of the virtual space in which a virtual user exists can be provided to a physical user, and, as a result, interest in the game as a whole can be stimulated.

BRIEF DESCRIPTION OF DRAWINGS

FIG. 2 is a diagram for explaining a configuration of a social game provided by a game server of the present disclosure.

FIG. 3 is a diagram showing a hardware configuration of the game server of the present disclosure.

FIG. 5 is a diagram showing a specific process of a quest part.

FIG. 8 is an explanatory diagram of a specific example of a virtual position data table.

FIG. 9 is an explanatory diagram of a specific example of an attribute data table.

FIG. 10 is a diagram showing a specific example of an image of a map displayed on a touch panel of a terminal.

FIG. 11 is a diagram for explaining a configuration of a piece stored in a piece storing section.

FIG. 12 is a diagram for explaining a process performed in a quest part processing section of the first embodiment.

FIG. 15 is a flowchart for explaining an event generating process performed by an event generating section of the first embodiment.

FIG. 18 is a diagram for explaining a process of a quest part processing section according to a second embodiment.

DETAILED DESCRIPTION OF EMBODIMENTS

Further features of the disclosure will become apparent from the following detailed description of exemplary embodiments with reference to the attached drawings.

Figure 1:
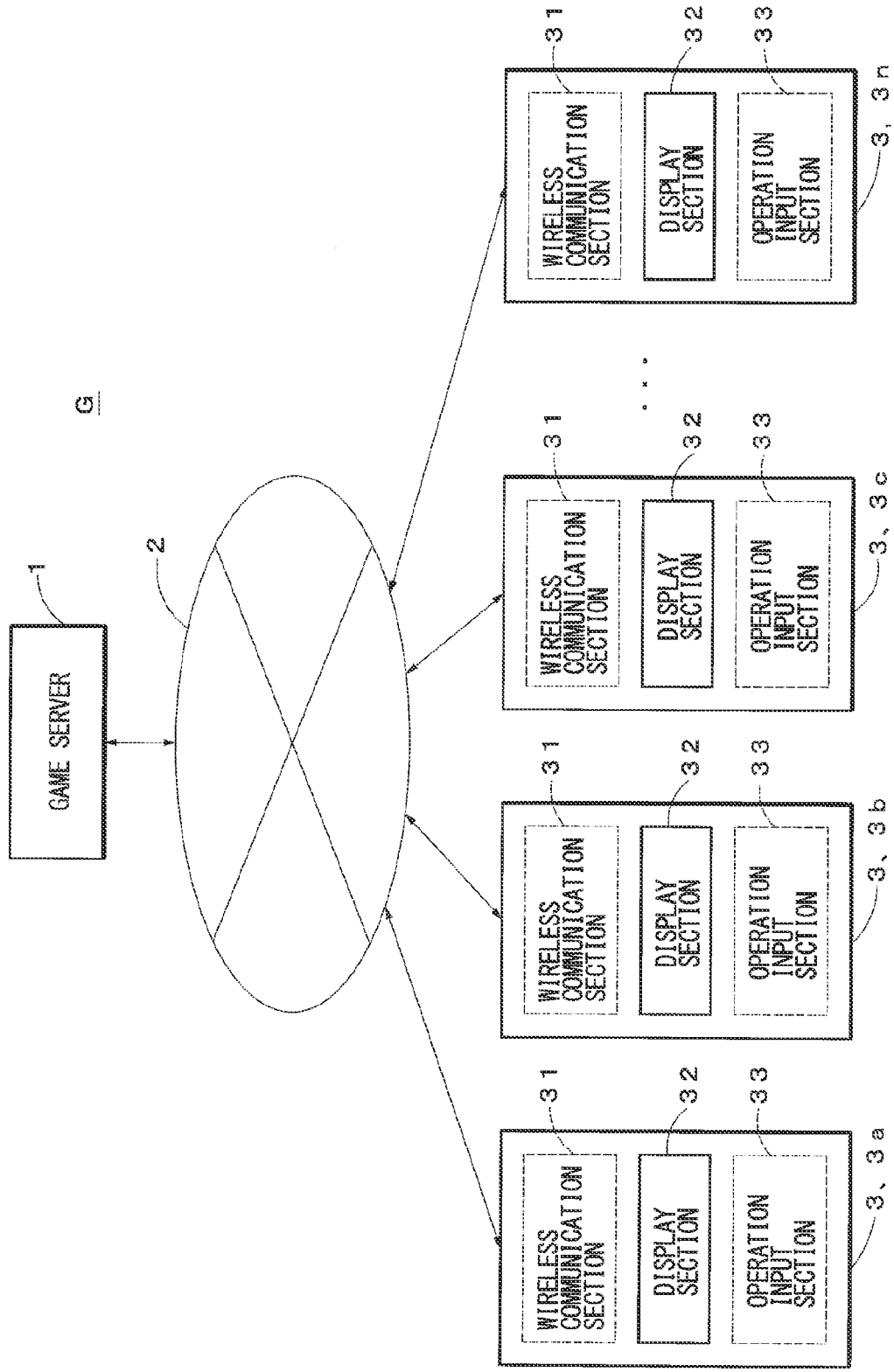
FIG. 1 is a diagram showing a system configuration of a game system of the present disclosure.

An embodiment for implementing the present disclosure (hereinafter referred to as the present embodiment) will now be described with reference to specific examples. The present embodiment relates to a game system that provides a game to a terminal connected to a game server via a communication network. Specifically, as shown in FIG. 1, a game system G of the present embodiment includes a game server 1 that provides a game to a user who is operating a terminal, and terminals 3a, 3b, 3c, . . . , 3n (hereinafter, collectively referred to as a terminal 3) connected to the game server 1 via a communication network such as the Internet 2.

In the following description, prior to describing the embodiment, the definitions of terms used in the present embodiment will be clarified. Then, a general outline of a social game concerning the present embodiment will be described, and thereafter, a configuration of the game system G and a process performed by the game system G will be described in detail.

(1) Definitions Of Terms

The definitions of terms used in the present embodiment are as follows.

"Virtual space" means a virtual world that is created during a game based on content of the game and refers to a space different from a physical space. The "virtual space" shown on a display (a display section) of the terminal 3 is two-dimensional. However, a conceptual space created by executing a program in the server 1 via a communication network with connections to another terminal 3 is not limited to a two-dimensional space.

"Physical user" means an entity operating a terminal, i.e., a person. "Virtual user" means a virtual entity representing the physical user in the virtual space in accordance with a button operation or a touch operation on the terminal of the physical user, or a virtual entity which is created based on a taste or preference of the physical user. The "virtual user" includes, for example, a virtual entity like a player in conventional shogi games or mahjong games that is not visible in the game and operates pieces or tiles in the virtual space as an existence representing the "physical user". The "virtual user" also includes a particular visible character that is displayed in the game such as a role playing game or a player-versus-opponent game and that moves or performs an action. Further, the "virtual user" includes a virtual entity displayed as an avatar in a SNS. Accordingly, the "virtual user" in the present embodiment is used as a term that broadly represents the virtual entity in the virtual space, regardless of whether it is a virtual entity which is embodied in a game or a virtual entity which is not embodied.

"Two-dimensional map" means a map that is presented on a plane shown on a display (a display section) of the terminal 3, and expresses a plurality of positions located on a plane in the virtual space and a route connecting the positions under a certain rule. "Virtual position" means a position, in the virtual space, on a plane located in such a manner that the virtual user is reachable.

"Point" means a point granted to the virtual user in the virtual space and allows a target game part to progress when the virtual user consumes the point in the virtual space. "Operation data that requests progress of a game part related to a virtual user" means operation data that requests that the point granted to the virtual user be used and that a target game part progress depending on the point consumed by being used. "Received content of operation data" means, for example, the number of times operation data is received, an instruction represented by the operation data, and a decision represented by the operation data.

(2) General Outline Of Social Game

Next, a general outline of a social game provided from the game server 1 to the terminal 3 connected via the Internet 2 will be described with reference to FIG. 2.

Generally, a social game is a game played in a virtual space by a virtual user performing an action in response to an operation of the terminal 3 by the physical user. A type of the social game is a game in which a set of a predetermined number of cards (hereinafter, referred to as a card deck) is created from among various kinds of, e.g., several hundreds of kinds of, virtual cards (hereinafter, simply referred to as cards) each having a character displayed thereon. More specifically, the user collects and strengthens the cards by battling against enemies appearing in the virtual space using the cards or by trading the cards with another virtual user, while upgrading a level and selecting an attribute of the card in the card deck. In a battle using the cards, a damage to an enemy or a result of the battle is determined based on the level of offensive and defensive powers of each card constituting the card deck, a skill (corresponding to a "meld" as used in a card game or mahjong) with which a certain effect can be obtained by a predetermined combination of cards, and so on.

This type of social game is established as a single game and as a whole with a plurality of parts being combined organically to complete a single story or a character. For example, as shown in FIG. 2, a social game 20 includes a quest part 21, a combination part 22, a battle part 23, a gacha-part 24 and a trade part 25, and each part serves as a game element.

As represented by the term "quest", which means "to search, to explore and to have an adventure" or the like, the quest part 21 is a part constituting a game in which a virtual user travels throughout in a virtual space, battles against enemies that appear during the travel, obtains a new card, and improves the level of the virtual user. In the quest part 21, the virtual user is given a predetermined number of quest points, and actions such as a movement of the virtual user, an obtainment of an item, an improvement of the level, and so on, are accomplished by consuming the quest point. In the quest part 21, the virtual user battles against an enemy that has appeared by using the possessed cards and consuming a battle point.

The combination part 22 is a part in which cards possessed by the virtual user are combined to increase the card level representing the strength of the cards, so as to increase an offensive power for damaging enemies and/or a defensive power for defending from enemies during a battle.

The battle part 23 is a part in which the cards possessed by the virtual user are used to battle against another virtual user. A win or a loss is determined based on the offensive power and the defensive power of each of the cards described above.

The gacha part 24 is a part named after "gacha-gacha," which is an imitative word expressing the sound and manner in which a capsule toy, which is a toy enclosed in a capsule, is ejected from a toy vending machine after a coin is inserted into the machine. In the gacha part 24, the virtual user obtains a card randomly based on an occurrence rate of each card by using, for example, a gacha point or gacha authorization that is virtually provided instead of a coin.

The trade part 25 is a part via which the virtual user exchanges the cards in possession with another virtual user. Each virtual user adds advantageous cards obtained via the trade part 25 into a card deck to strengthen the card deck as a whole by increasing the level of offensive power for damaging an enemy and/or the defensive power for defending against attack from an enemy.

The social game 20 consisting of the plurality of parts described above has been meaningful as an entire game because none of the game parts is independent from the other, in other words, each of the game parts is related and combined with the other. Therefore, with the social game 20, an entire game can be progressed by making progress in each of the game parts.

(3) Basic Hardware Configuration (3-1) Configuration of Terminal

Hereinafter, a hardware configuration for obtaining a game system G of the present embodiment will be described based on the definition of the social game 20 described above.

As shown in FIG. 1, the terminal 3 may be a portable wireless communication terminal such as a smartphone, and may include, for example, a wireless communication section 31, a display section 32 that may be of a liquid crystal display type, and an operation input section 33 for operating the terminal with a touch input or a key input. The terminal 3 is connected to the Internet 2 by a wireless communication section 31 through a mobile telephone line or a wireless LAN circuit and performs data communication with the game server 1 by using a web browser. Further, the terminal 3 displays a web browser screen on the operation input section 32, which is usually a touch screen, and inputs a user operation such as a selection operation by touching the screen.

With the terminal 3 having such a hardware configuration, for example, an individual authentication process of the terminal is performed using a combination of a pre-registered user ID and a predetermined password. When the authentication between the terminal 3 and the game server 1 is completed, the terminal 3 receives data necessary for progression of a game from the game server 1 and transmits operation data inputted though the operation input section 32 to the game server 1 as described below.

The terminal 3 can be a mobile telephone, a PDA or a personal computer as long as it is a communication device capable of communicating with the game server 1 via a communication network such as the Internet 2. The operation input section 32 has been described using a touch panel as an example, but may be of a configuration in which information is inputted through performing a selection operation by moving a cursor with a physical key operation.

(3-2) Schematic Configuration of Game Server

The game server 1 to be connected to the terminal 3 is embodied as a computer having a general-purpose hardware configuration as shown in FIG. 3, for example. That is to say, as shown in FIG. 3, the game server 1 includes a communication interface section 11 that establishes communications with the terminal 3 via the Internet 2, and an operation input unit 12 such as a keyboard or a mouse that allows an operation input from a physical user. Further, the game server 1 is provided with an arithmetic processing section 13 such as a CPU that executes various arithmetic processing, a main memory 14 such as an SRAM or a DRAM that temporarily stores arithmetic processing data, a storage unit 15 such as a hard disk in which application programs and various data are stored, and a display 16 that displays an outcome of the arithmetic process.

Figure 4:
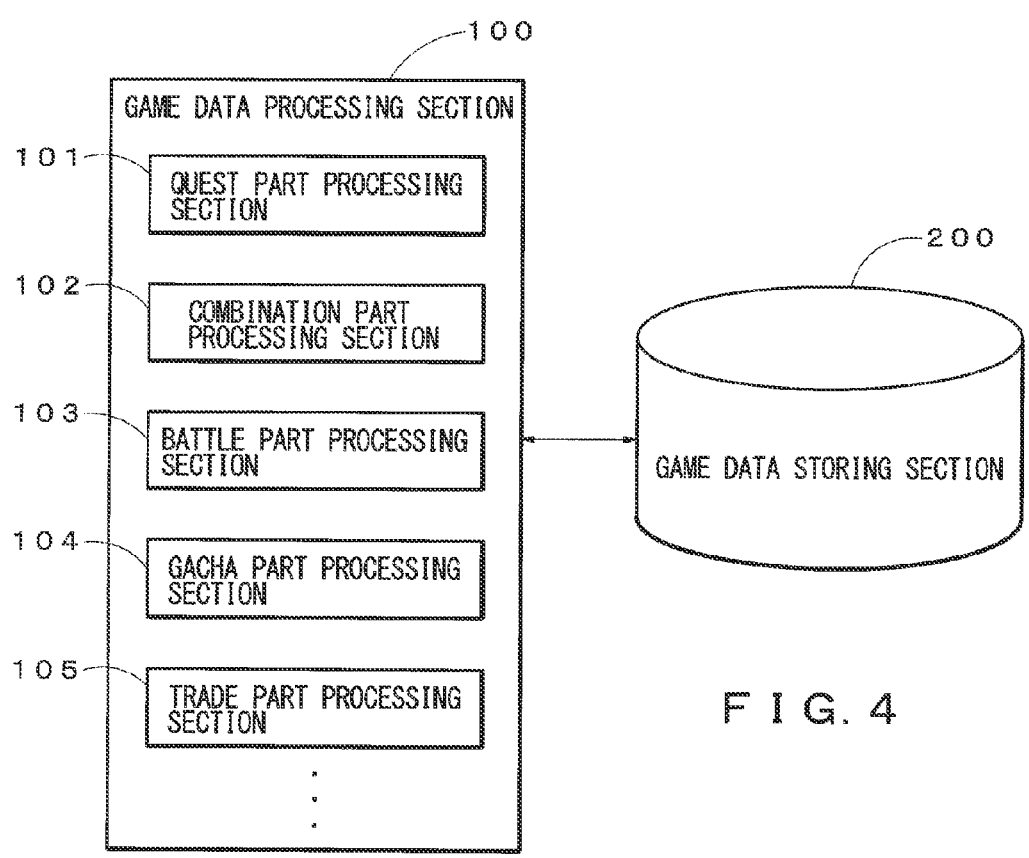
FIG. 4 is a diagram showing a configuration of each processing section executed by the game server of the present disclosure.

In the game server 1, by installing a program in the storage unit 15 for offering such social game 20 to a physical user, function blocks as shown in FIG. 4 are obtained.

That is to say, the game server 1 comprises, for example, as shown in FIG. 4, a game data processing section 100 that is comprised of a quest part processing section 101, a combination part processing section 102, a battle part processing section 103 and a gacha part processing section 104 as well as a game data storing section 200 that manages game data thus realizing the functions of the abovementioned sections.

Here, the quest part processing section 101 executes data processing for the quest part 21. The combination part processing section 102 executes data processing for the combination part 22. The battle part processing section 103 executes data processing for the battle part 23. The gacha part processing section 104 executes data processing for the gacha part 24. The trade part processing section 105 executes data processing for the trade part 25.

(3-3) Specific Configuration of Game Server

Now, among the parts processed by this type of game server 1, a specific configuration and process details for achieving the quest part 21 will be described with reference to FIG. 5.

(3-3-1) Configuration of Game Data Storing Section

Data to be used in the quest part 21 is stored in the game data storing section 200. As shown in FIG. 5, in the game data storing section 200, a virtual space information storing section 201, a map data storing section 202, a virtual position data table 203, an attribute data table 204 and a quest display image table 205 are stored.

The virtual space information storing section 201 obtains information regarding a virtual position where the virtual user can exist, i.e., a node arranged on a plane, as coordinate position information on the plane and stores this as virtual space information.

Figure 6B:
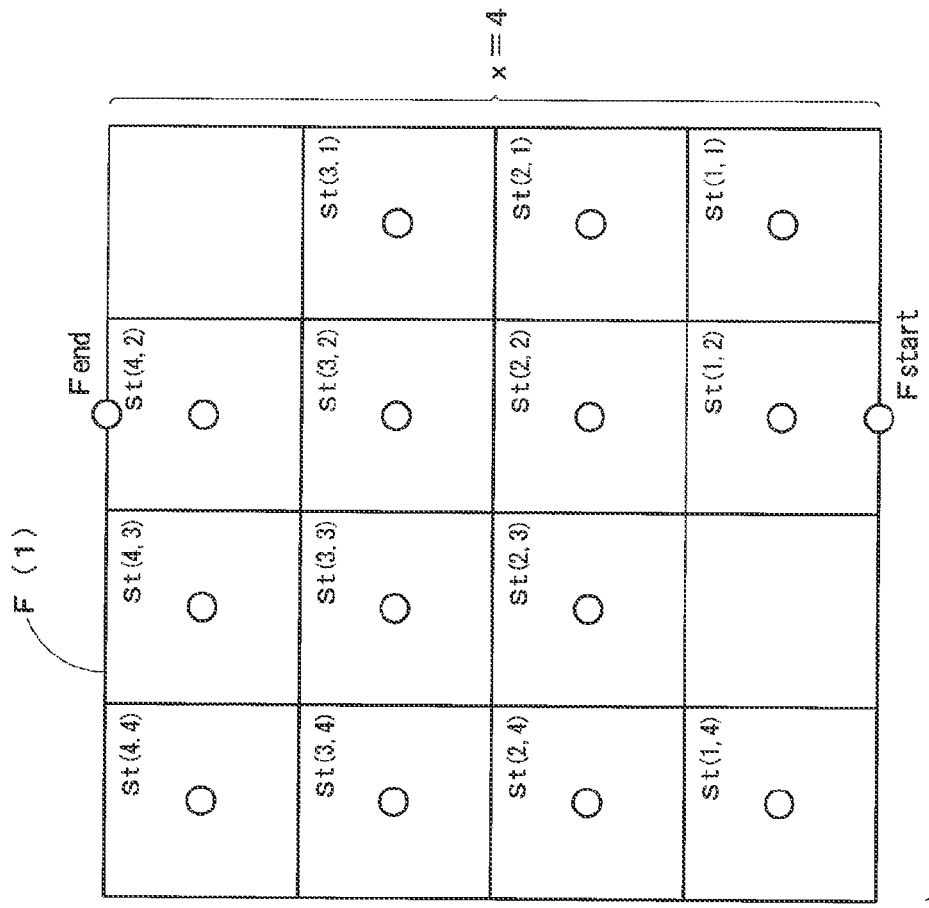
FIGS. 6A and 6B are diagrams for explaining a concept of virtual space information stored in a virtual space information storing section.
Figure 6A:
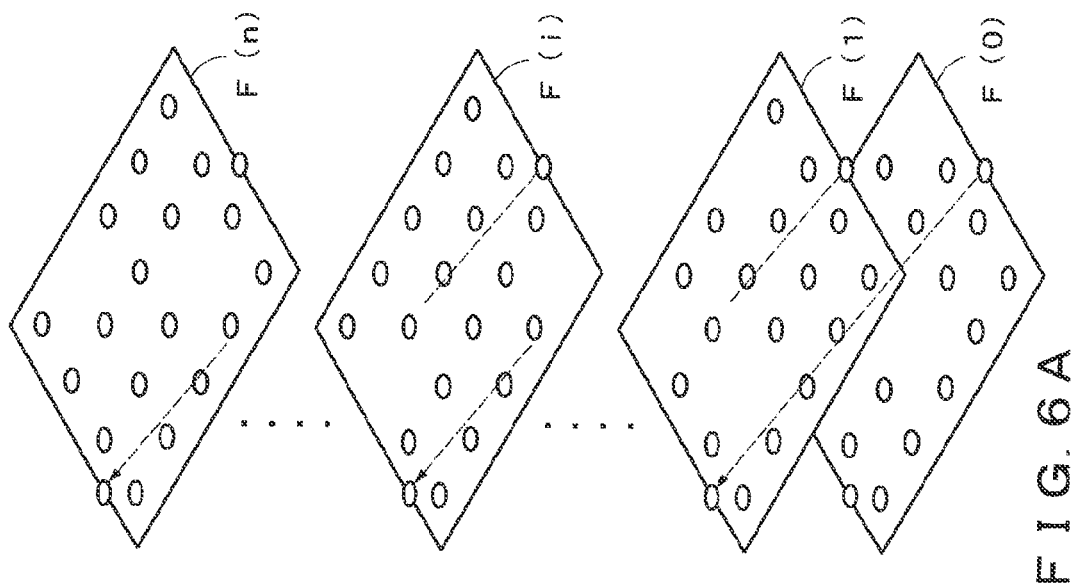

An image of the virtual space constituting the entire quest part is shown in FIGS. 6A and 6B. The virtual space information is information for specifying a virtual position where the virtual user exists or a virtual position reachable by the virtual user by consuming a quest point as shown in FIGS. 6A and 6B.

More specifically, as shown in FIG. 6A, the quest part 21 is constituted by two-dimensional planes configured as a plurality of layers (F(1)-F(n)), and the virtual space is formed by the entirety of the layers. In the present embodiment, a single closed region in one of the layers forming the virtual space is referred to as a "field". That is to say, the virtual space is constituted by fields F(0), F(1), ... F(n) as shown in FIG. 6A.

Field F(i), where "i" is any number in the range of 0 to n, and has an entire region that is divided into a matrix of a plurality of blocks (here, divided into squares where each side has a virtual length of "1" unit). For example, as shown in FIG. 6B, Field F(i) is constituted by 16 rectangular blocks that are arranged into a matrix, 4 blocks vertically (x) by 4 blocks horizontally (y). Further, Field F(i) is each provided with a stage St (a, b) at each of the center of blocks specified by the coordinates (a, b) in a two-dimensional Cartesian coordinate system.

This Field F(i) is connected by a map creating section 40 in such a manner that the respective stages are connected via a route (link) to be described below. That is to say, an end position Fend can be reached by starting from a start position Fstart and passing through a predetermined stage via a route. In this case, as shown in FIG. 6B, it is acceptable to have a block on which the stage St (a, b) is not located.

The virtual space information storing section 201 stores, for each Field F(i), position coordinate information regarding the stage St (a, b) which is node information constituting Field F(i), which serves as information for establishing such a virtual space.

The map data storing section 202 stores map data including node and link information. The nodes associated with each stage stored in the virtual space information storing section 201 are connected by a route (link) by the map creating section 40 described later. For example, in order to constitute Field F(1) of the first layer as shown in FIG. 7A, the map data storing section 202 stores map data 350, as shown in a table of FIG. 7B, which includes node information representing a stage number, node information to be connected by a link represented by a reachable stage information, and event data generated in the stages.

Figures 7A, 7B:
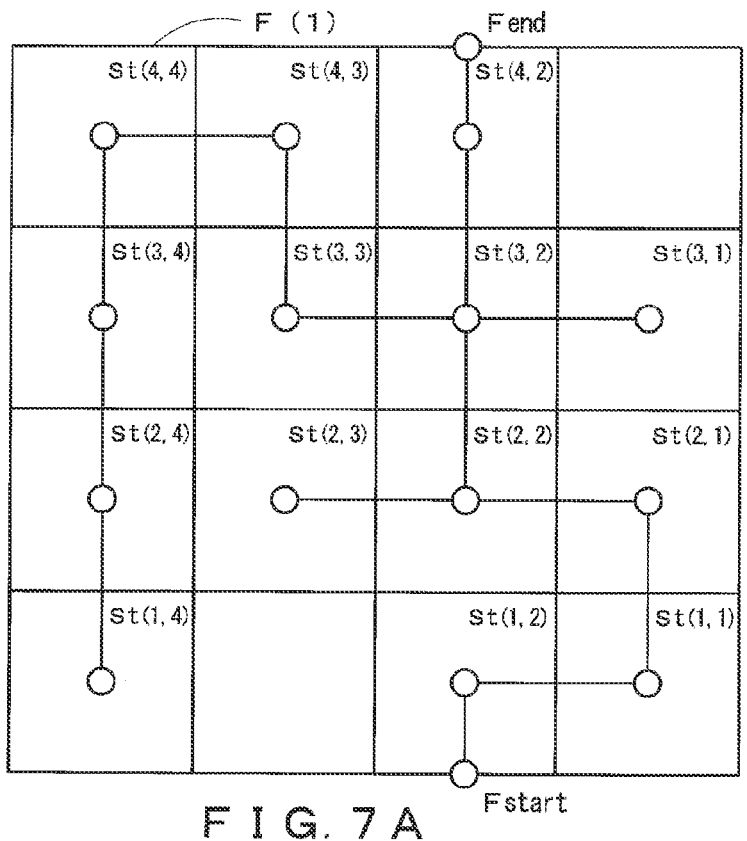
FIGS. 7A and 7B are diagrams for explaining a specific example of map data.

More specifically, as shown in FIG. 7B, the map data 350 contains node information related to a total of fourteen stage positions which are arranged two-dimensionally in Field F(1) as virtual positions and link information indicating a connection relationship between the stages. In the map data 350 represented by the table in FIG. 7B, Reachable Stage "St (2, 1) (15)" for Stage Number "St (1, 1)" indicates that a stage St (2, 1) can be reached from the stage St (1, 1) by consuming "15" quest points, which will be described below. Similarly, Reachable Stage "St (2, 3) (20)" for Stage Number "St (2, 2)" indicates that the stage St (2, 3) can be reached from the stage St (2, 2) by consuming "20" quest points, and Reachable Stage St "St (3, 2) (15)" indicates that the stage St (3, 2) can be reached from the stage St (2, 2) by consuming "15"quest points. The map data storing section 201 stores the map data 350 containing such information in each and every field.

In the above description, "stage" is an example of a virtual position. When the virtual user reaches a stage, the virtual user obtains either an item or a card or battles with an enemy that has appeared. "Field" is a planar virtual space having a plurality of such "stages" arranged therein. The entire quest part is constituted by a plurality of such fields, each having a plurality of stages arranged therein, provided in a layered structure. The terms "stage" and "field" used herein are merely distinguished for the sake of convenience. For example, depending on a story in a game, the term "field" may be used for a position where the virtual user can exist in the virtual space and the term "stage" may be used for a single closed virtual space where the "field" is located, which is opposite to the definition of the present embodiment.

The virtual position data table 203 (see FIG. 5) stores identification data of a virtual user existing at each stage in each field F(i), as shown in FIG. 8, for example. The virtual position data table 202 is, for example, used for understanding the quantity of the virtual users and identity of each virtual user existing at each stage. Specifically, as identification data, the virtual position data table 203 stores an ID number which identifies a virtual user that exists at each stage such as information indicating that virtual users with an ID number of "11134" and "14375" exist at stage St (2, 2) in Field F(1).

The attribute data table 204 (see FIG. 5) contains attribute information on virtual users existing in the virtual space for each virtual user. For example, as shown in FIG. 9, the attribute data table 204 contains position information, level information, quest point information, battle point information, gacha point information and obtained card list information as attribute information for each virtual user.

In the attribute data table 204, "Position Information" indicates coordinates of a virtual position where a virtual user exists. For example, Position Information "F(1) St (2, 2)" indicates that a virtual user exists at stage St (2, 2) in Field F(1) shown in FIG. 7A. "Level Information" is a numerical value representing a level of strength of a virtual user in the game. When the game starts from level 1, this numerical value increases with the progress of the game to, for example, Level 2 and Level 3. For example, Level Information "L6"indicates that the level of the virtual user is at a sixth level. In the present embodiment, as a specific example of upper and lower limits of the level, the lowest level is Level 1 and the highest level is Level 90.

Concerning this level, a single level is given in the entire game, rather than giving a unique level for the quest part, which is only one part of the game. Also, depending on the game, it may not be necessary to have a concept of a level for the virtual user.

"Quest Point" information indicates the number of points consumed as a cost in the quest part 21 when the virtual user moves between the stages while traveling throughout in the virtual space. "Battle Point" information indicates the number of points consumed as a cost when a virtual user battles against another virtual user in the battle part 23, or when attacking an enemy that has appeared when traveling throughout in the virtual space in the quest part 21. "Gacha Point" information indicates a point consumed as a cost when the virtual user obtains an item via gacha lot in the gacha part 24. "Obtained Card List" information indicates a list of cards obtained by the virtual user.

The quest display image table 205 (see FIG. 5) contains data for displaying an image of the map on the terminal 3 connected via the Internet 2. Specifically, as has been described with reference to FIG. 7, when the virtual user exists at the stage St (2, 2) in Field F(1), to present an image 400 of a displayable area shown in the display section 32 of the terminal 3 as shown in FIG. 10, the quest display image table 205 contains display image data described below.

That is to say, the quest display image table 205 contains data for displaying a stage display image 411 (a black dot in FIG. 10) that indicates a stage where the virtual user actually exists, e.g., the stage St (2, 2), and data for displaying a stage display image 412 (a white dot in FIG. 10) that indicates a stage around the stage St (2, 2). The quest display image table 205 also contains data for displaying an already-passed-through-route display image 421 that indicates a route (shown by a solid line in FIG. 10) between the already-reached stages and data for displaying a not-passed-through-route display image 422 that indicates a route (shown by a broken line in FIG. 10) between the unreached stages and between the unreached stage and the reached stage.

Further, the quest display image table 205 contains data for displaying a virtual user display image 431 (a white square in FIGS. 10) and 432 (a white triangle in FIG. 10) that allows determination of whether or not another virtual user in each stage is an ally.

(3-3-2) Configuration of Quest Part Processing Section

The specific configuration of the quest part processing section 101 will now be described. As shown in FIG. 5 explained above, the quest part processing section 101 includes the map creating section 40, a quest image transmitting section 41, an operation data receiving section 42, a virtual position changing section 43, a data table updating section 44, a destination selection data transmitting section 45 and an event generating section 46.

The map creating section 40 generates two-dimensional map information from the virtual space information stored in the virtual space information storing section 201 and creates a two-dimensional map by connecting a route between the stages located on Field F(1). Specifically, the map creating section 40 is provided with a piece storing section 40a in which a plurality of kinds of pieces are stored.

Pieces stored in the piece storing section 40a are of the same shape as the blocks obtained by dividing Field F(1) and serve as connecting pieces that connect the route from one edge of the block to at least one of the other edges of the block. For example, as shown in FIG. 11, six types of pieces are used.

In other words, connecting pieces 401, 402 are pieces that connect a route from one edge of the block to at least one of the other edges of the block via the center part of the block. A connecting piece 403 is a connecting piece that connects a route from one edge of the block to two of other edges of the block, respectively, via the center part of the block. A connecting piece 404 is a piece that connects a route from one edge of the block to three other edges of the block, respectively, via the center part of the block.

The piece storing section 40a contains a connecting piece 405 that connects a route from the center part of the block to an edge of the block to create a route to a stage terminated, and a connecting piece 406 that does not have a route in order to represent a block on which a stage does not exist.

By rotating the plurality of kinds of connecting pieces described above 90 degrees, 180 degrees or 270 degrees, and combining them, the map creating section 40 creates a two-dimensional map having a configuration of Field F(1) shown in FIG. 7A.

It is particularly preferable that the connecting piece has the same shape as the rectangular block that divides the field equally in a matrix form, since the stages can be easily divided and connected when creating a two-dimensional map. However, the shape of the connecting piece is not limited thereto. That is to say, the connecting piece may be any polygon such as a triangle or a hexagon that divides the field and that connects a route from one edge of the polygon to at least one of the other edges of the polygon.

The quest image transmitting section 41 transmits data for displaying an image of a map to at least one terminal 3 connected via the Internet 2 based on data stored in the game data storing section 200.

Specifically, the quest image transmitting section 41 sets a displayable region that is a region that can be displayed on the terminal 3. Thereafter, the quest image transmitting section 41 retrieves, from the quest display image table 204, the image display data for constituting an image of the displayable region thus set. Then, the quest image transmitting section 41 combines the retrieved display image data and transmits, to the terminal 3, the aforementioned display processing data for displaying an image shown in FIG. 10. Also, the display process data transmitted by the quest image transmitting section 41 is not limited to image data, but may also be display control data for controlling the display of the image data stored on the terminal 3 side.

The operation data receiving section 42 receives operation data from at least one terminal 3. The operation data representing, for example, an operation that requires progress in the quest part. Specifically, the operation data receiving section 42 receives operation data indicating that a quest point is used for moving between the stages and operation data indicating that a battle point is used for battling against an enemy that has appeared.

The virtual position changing section 43 has a consumption point calculating section 43a and a reached state determination section 43b for changing the stage where each virtual user exists based on the received operation data indicating that a quest point that is consumed by the operation data receiving section 42 is used.

The consumption point calculating section 43a calculates accumulated quest points consumed depending on the content of the received operation data. Specifically, the consumption point calculating section 43a calculates accumulated quest points consumed depending on the number of times the operation data is received. The reached state determining section 43b determines whether the virtual user to be operated or processed (hereinafter also referred to as a target virtual user) has reached a destination virtual position based on the accumulated quest points. Although in the present embodiment, the number of times the operation data is received is used as a specific example of the content of the operation data received, an instruction represented by the operation data or a decision indicated by the operation data may be used instead.

The data table updating section 44 updates identification data in the virtual position data table 202 when the stage where each virtual user exists is changed by the virtual position changing section 43.

The destination selection data transmitting section 45 transmits, to the terminal 3, data related to options for selecting a destination stage.

The event generating section 50 generates an event to lead the virtual user to a certain route. The event generating section 50 has a stage selecting section 51 and a generation processing section 52 for generating an event for a stage.

The stage selecting section 51 arbitrarily selects a stage, from the stages arranged on the map, where a virtual event, which is an opportunity for obtaining a card or an item, is generated and notifies the event generating section 52 of the selected stage.

The stage selecting section 51, for example, is configured in such a manner that a stage that contains a so-called detour route containing more numbers of virtual positions on the route is selected on a map in which a plurality of (e.g., two) stages are reachable from the stage where the virtual user currently exists and in which one of the stages is on a "short cut" that has no other stages between the current stage and the reachable target stage, whereas the other stage is on a "detour" that has at least one more stage before the target stage.

The stage selecting section 51 may also be configured in such a manner that an unreached stage described later that a virtual user has not reached is selected preferentially. For example, when Stages St (1, 4) and St (2, 4) are unreached stages, these two Stages St (1, 4) and St (2, 4) are selected as stages where an event is generated preferentially as compared to other stages.

The generation processing section 52 is a section that causes an event that leads the virtual user to a certain route to be generated at a stage selected by the stage selecting section 51. For example, when Stages St (1, 1) and St (3, 1) are selected by the stage selecting section 51, events are generated as follows: when a virtual user has reached the stage St (1, 1), the generation processing section 52 generates an event that provides a "quest point recovery item" with which the quest points can be recovered; when a virtual user reaches the stage St (3, 1), the generation processing section 52 generates an event that provides a "battle point recovery item" with which the battle points can be recovered. Data indicating the content of the event generated in each stage by the generation processing section 52 is, for example, stored in the map data 350 shown in FIG. 7B explained above as event data associated with the stage number. Based on the event data stored in the map data 350, the quest image transmitting section 41 transmits, to the terminal 3, display process data to cause an announcement of an event to be displayed.

(4) Process In Game Server (4-1) Process of Quest Part Processing Section of First Embodiment A process related to a first embodiment of the quest part processing section 101 having the aforementioned configuration will be described with reference to FIG. 12.

In step S1201, the quest part processing section 101 creates a two-dimensional map with the map creating section 40 by combining a total of six types of the connecting pieces 401-406 shown in FIG. 11 for a field on which a virtual user to be a target of the process (hereinafter also referred to as a target virtual user) exists (hereinafter also referred to as a target field), and the process of the game server proceeds to step S1202.

In step S1202, the quest part processing section 101 generates an event for a stage constituting a target field with the event generating section 50, which will be described in detail below, and the process of the game server proceeds to step S1203.

In step S1203, the quest part processing section 101 changes the existing position of the target virtual user in the target field, which will be described in detail below, and the process of the game server proceeds to step S1204.

In step S1204, the quest part processing section 101 determines whether the target virtual user has moved between the fields or not, or whether a predetermined period of time, such as 24 hours, has elapsed or not. When one of the conditions is satisfied (S1204: YES), the process of the game server proceeds to step S1205, and when neither condition is satisfied (S1204: NO), the process of the game server returns to step S1203.

In step S1205, the quest part processing section 101 confirms whether or not a termination of the process has been accepted. For example, when there is an operation wherein an administrator managing the game server 1 changes the configuration of the field as in maintenance work, a termination instruction of the process from the administrator is accepted. When termination of the process is accepted (S1205: YES), the present process is terminated. When there is no instruction for termination of the process (S1205: NO), the process of the game server returns to step S1201.

(4-1-1) Process of Creating a Two-Dimensional Map (Step S1201)

Figure 13:
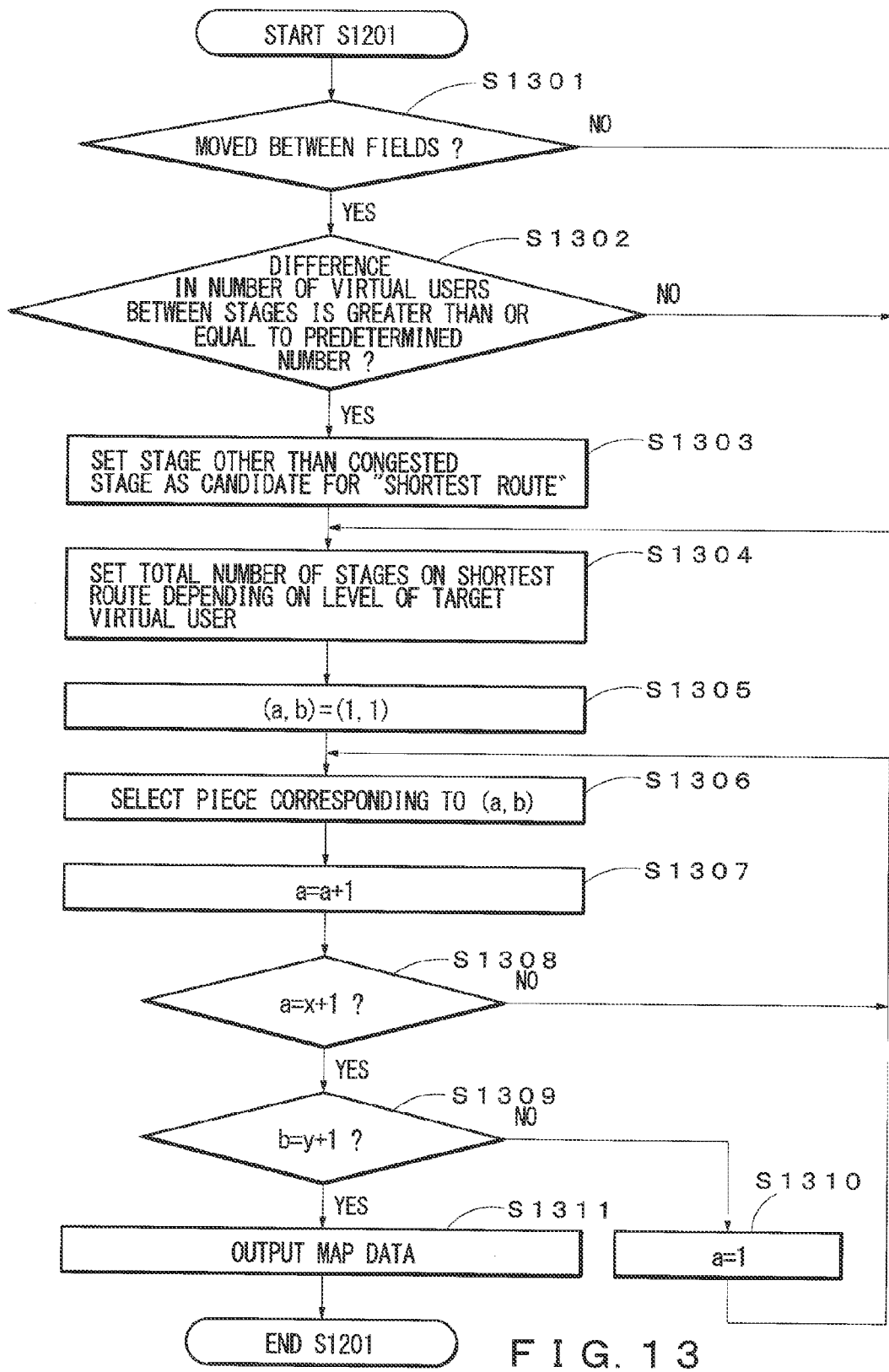
FIG. 13 is a flowchart for explaining a process of creating a two-dimensional map of the first embodiment.

As a specific process of step S1201, a process of creating a two-dimensional map with the map creating section 40 in accordance with a flowchart shown in FIG. 13 will be described.

The present process is based on the assumption that the map creating section 40 creates a two-dimensional map by combining the connecting pieces 401-406 of a total of six types shown in FIG. 11 described above. Also, in the present process, each field is constituted by blocks that are arranged into a matrix, 4 blocks vertically (x) by 4 blocks horizontally (y). The position where each stage is located is specified with coordinates (a, b) of a two-dimensional orthogonal coordinate system.

In step S1301, the map creating section 40 determines whether a target virtual user has moved between the fields, and if it has moved (S1301: YES), the process of the game server proceeds to step S1302, and if it has not moved (S1301: NO), the process of the game server proceeds to step S1304.

In step S1302, the map creating section 40 determines whether or not a difference in the number of virtual users between the stages constituting the target field is greater than or equal to a predetermined number. Specifically, it is determined whether or not there is any stage in which the difference in the number of virtual users with respect to the stage having the smallest number of virtual users is greater than or equal to a predetermined number (hereinafter referred to as a congested stage). When the difference in the number of virtual users is greater than or equal to the predetermined number (S1302: YES), the process of the game server proceeds to step S1303, and when the difference in the number of virtual users is less than the predetermined number (S1302: NO), the process of the game server proceeds to step S1304.

In step S1302, the difference in the number of virtual users between the stages is used as an example of an evaluating index for evaluating unevenness of distribution of the virtual users between the stages. For example, unevenness of distribution of the virtual users between the stages may be evaluated using other evaluation indices such as a standard deviation or a variance. In such a case, for example, a stage having a deviation greater than or equal to a predetermined value may be determined as a "congested stage", and the program proceed to step S1303.

In step S1303, in order to mitigate further concentration of virtual users in the congested stage, a stage other than the congested stage is set as a candidate for the shortest route from the start position Fstart to the end position Fend, and the process of the game server proceeds to step S1304.

In step S1304, the map creating section 40 sets the total number of stages to "the shortest route" depending on the level of the target virtual user, and the process of the game server proceeds to step S1305. Specifically, the map creating section 40 sets the total number of stages on "the shortest route" to increase as the level of the target user becomes higher. In this manner, by adjusting the difficulty of completing the target field depending on the level, the map creating section 40 can provide an environment in which a wide range of players from beginners to advanced level players can enjoy the game depending on the game progression status.

The level of the target virtual user is merely an example of attribute data of the target virtual user and other parameters may be used. For example, a target virtual user that prefers the quest part 21 may be estimated based on a consumption trend of points possessed by the target virtual user for each part and an operation history, and, for a virtual user preferring the quest part 21, the total number of stages on the "shortest route" may set to be greater as compared to that of a different virtual user who prefers other game parts.

In step S1305, the map creating section 40 sets the coordinates (a, b) of a target block in the target field to (1, 1), which is an initial value, and the process of the game server proceeds to step S1306.

In step S1306, the map creating section 40 selects a connecting piece corresponding to the target block from the piece storing section 40a and the process of the game server proceeds to step S1307. Specifically, the map creating section 40 selects a connecting piece corresponding to each target block based on the settings in step S1303 and S1304 described above.

In step S1307, the map creating section 40 updates the coordinates of the target block from (a, b) to (a+1, b), and the process of the game server proceeds to step S1308.

In step S1308, the map creating section 40 determines whether the variable "a" takes a value "x+1" or not. That is to say, it is determined whether or not the target block is beyond a laterally defined edge of an outer boundary of the field. In cases in which the variable "a" does not take a value "x+1" (S1308: NO), the program returns to step S1306, and in cases in which the variable "a" takes a value "x+1" (S1308: YES), the process of the game server proceeds to step S1309.

In step S1309, the map creating section 40 determines whether or not a variable "b" takes a value "y+1". That is to say, it is determined whether or not the target block is beyond a longitudinally defined edge of the outer boundary of the field. In cases in which the variable "b" does not take a value "y+1" (S1309: NO), the process of the game server proceeds to step S1310, and in cases in which the variable "b" takes a value "y+1" (S1309: YES), the process of the game server proceeds to step S1311.

In step S1310, the map creating section 40 resets the value of the variable "a" to 1, and returns to step S1306. By resetting the value of the variable "a" in this manner, the position of the target block in the lateral direction is returned to the initial position.

Figures 14A, 14B:
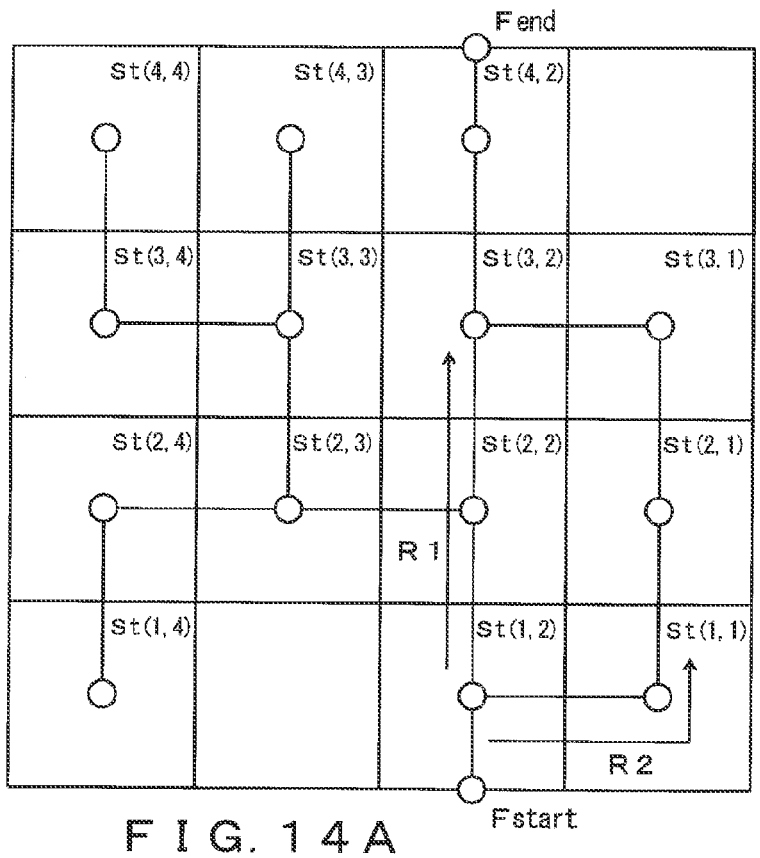
FIG. 14A is a diagram for explaining a two-dimensional map created by the process of creating a two-dimensional map of the first embodiment and map data thereof.
FIG. 14B is a table of map data associated with the map of FIG. 14A.

By repeatedly performing the processes of the aforementioned steps S1306-S1310, the map creating section 40 creates, for example, a two-dimensional map as shown in FIG. 14A, which is different from the two-dimensional map shown in FIG. 7A described above for the same Field (1). Here, as shown in FIGS. 7A and 14A, the map creating section 40 creates maps having stages located at the same position in the field F(1), and the route connecting the stages that is being changed.

In step S1311, the map creating section 40 causes the map data corresponding to the created two-dimensional map to be stored in the map data storing section 202, and this process step is terminated. For example, the two-dimensional map as shown in FIG. 7A is stored in the map data storing section 202 as the map data as shown in FIG. 7B, and this process step is terminated. Also, the two-dimensional map as shown in FIG. 14A is stored in the map data storing section 202 as the map data as shown in FIG. 14B, and step S1201, which is the present process step, is terminated and the process of the game server proceeds to step S1202.

(4-1-2) Event Generating Process (Step S1202)

Next, for example, as a specific process content of step S1202, in the quest part processing 101, a process of the flowchart shown in FIG. 15 is performed by the event generating section 50 to produce an event for leading the virtual user to a certain route.

In step S1501, the event generating section 50 sets a total number of event generation N, and the process of the game server proceeds to step S1502. Here, the total number of event generation N may be determined based on the number of stages arranged in the field or the like.

In step S1502, the event generating section 50 sets a number of event generation E to zero. The number of event generation E indicates a number of times a virtual event, which is a chance of obtaining cards and items, is generated and the process of the game server proceeds to step S1503.

In step S1503, the stage selecting section 51 selects, from the stages located on the map, a target stage for which an event is to be generated, and the process of the game server proceeds to step S1504. The stage selecting section 51 notifies the generation processing section 52 of the selected stage.

In step S1504, the generation processing section 52 generates an event for leading the virtual user to a certain route at the stage selected by the stage selecting section 51, and the process of the game server proceeds to step S1505. Data indicating the content of the event generated by the generation processing section 52 is, for example, stored in the map data storing section 202 as event data that is associated with the map data as shown in FIG. 14B described above. Also, based on the event data stored in the map data storing section 202, the quest image transmitting section 41 transmits, to the terminal 3, display process data for causing an announcement of an event to be displayed.

In step S1505, the event generating section 50 updates the number of event generation E to E+1, and the process of the game server proceeds to step S1506.

In step S1506, the event generating section 50 determines whether or not the number of event generation E is a total number of event generation N. When the number of event generation E is the total number of event generation N (S1506: YES), step S1202, which is the present process step, is terminated (S1506: YES), and the process of the game server proceeds to step S1203. When the number of event generation E is not the total number of event generation N (S1506: NO), the program returns to step S1503.

In accordance with the aforementioned steps S1501-S1506, the event generating section 50 generates an event for each stage, and, as described above, the following method may be applied as a specific example of the selecting of the stages.

In other words, referring to FIG. 14, it is assumed that a virtual user exists at St (1, 2) and that there are two stages St (1, 1) and St (2, 2) that are reachable from St (1, 2). Here, assuming that St (3, 2) is a stage that is reachable by the virtual user or a target stage that the virtual user wishes to reach, there are two routes for reaching St (3, 2), i.e., Route R1 which is a shortcut for reaching St (3, 2) and Route R2 which is a "detour" for reaching St (3, 2). In such a case, the stage selecting section 51 selects the stage St (1, 1), St (2, 1) or St (3, 1) in a so-called detour route R2 that includes other stages on the route.

In this manner, when the stage St (1, 1), St (2, 1) or St (3, 1) is selected by the stage selecting section 51, the generation processing section 52 generates, for example, an event described below in step S1504.

In other words, the generation processing section 52 generates an event that provides a "quest point recovery item" with which a quest point is recoverable when the target virtual user has reached the stage St (2, 1). For the virtual user who has reached the stage St (3, 1) in field F(1), the generation processing section 52 generates an event for providing a rare card, which has a low appearance ratio and is difficult to obtain. Here, the card to be given to the virtual user is not necessarily limited to a rare card having a low appearance ratio, but by producing a particularly rare card, there is an advantage whereby the virtual user can be lead to the stage St (3, 1).

In selecting the stage to be a target for event generation, the process performed by the event generating section 50 is not limited to the process described above. For example, even if the stage is on a "detour" route, in a case in which it was determined to be a "congested stage" in step S1302 described above, it may be excluded from the event generation target stages. Also, the process of selecting the stage to be a target for event generation performed by the event generating section 50 can be performed with other selecting processes, such as randomly selecting the stages and generating an event. As an example of other selecting processes, for example, it is possible to preferentially select a stage that is not on the shortest route from the starting position Fstart to the end position Fend shown in FIG. 14A or the stages St (1, 4), St (4, 3) and St (4, 4) that serve as terminating stages, and to generate an event.

In this manner, by generating an event at an arbitrary stage by the event generating section 50, the present system can prevent a route along which the virtual user progresses from being selected in a fixed manner due to a connection relationship between the stages created by the map creating section 40.

(4-1-3) Process of Changing Stage where Virtual User Exists

Figure 16:
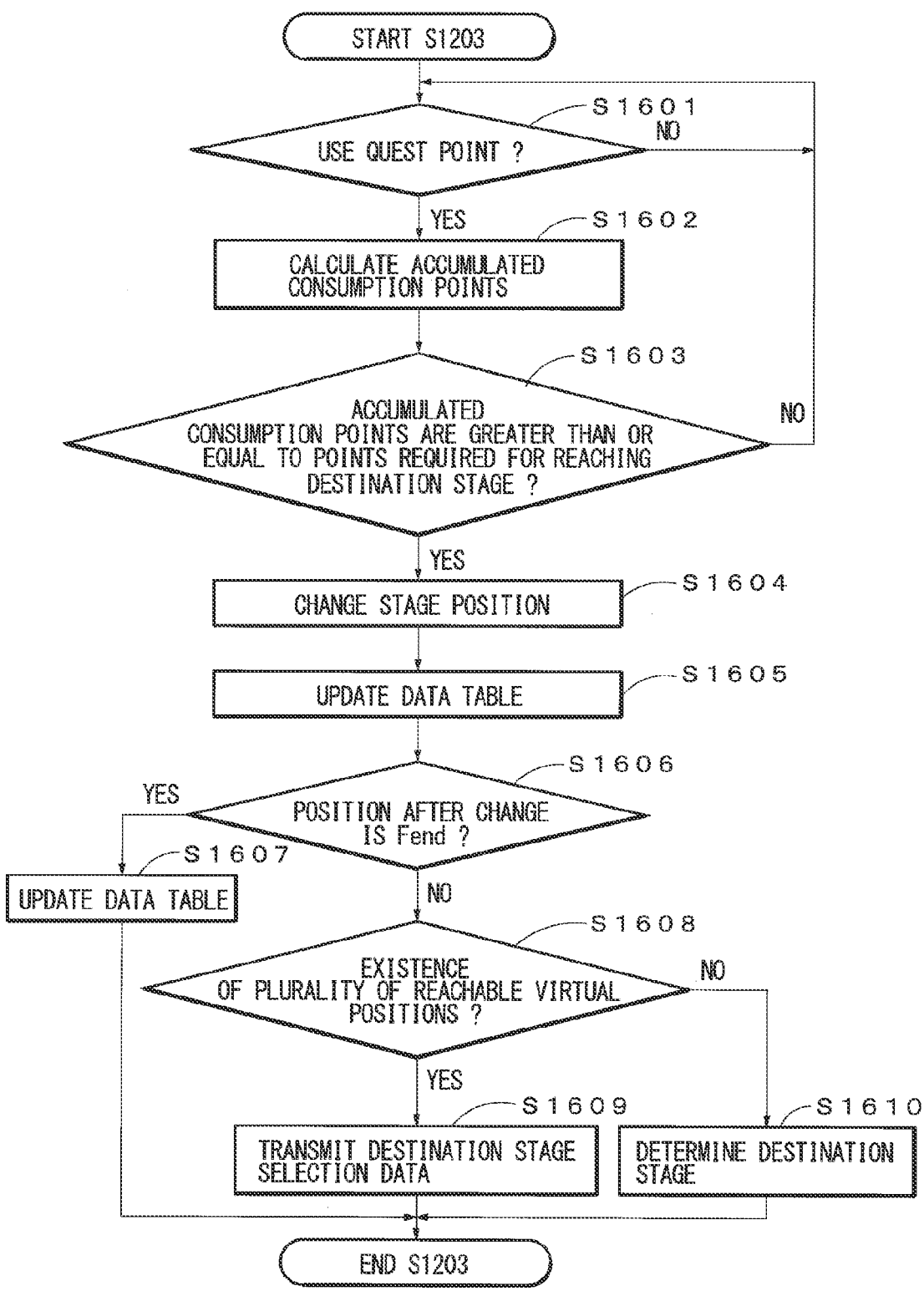
FIG. 16 is a flowchart for explaining a specific process of changing a stage where a virtual user exists according to the first embodiment.

As a specific process in step S1203, the quest part processing section 101 executes a process of changing a stage on which the virtual user exists in accordance with the flowchart shown in FIG. 16. As a prerequisite of this process, it is assumed that the destination stage of the target virtual user that is a target of the process has been determined. Also, it is assumed that each time the operation data that performs a usage request of the quest points is received from the terminal 3, the quest points of the target virtual user will decrease by "3" points. For example, the quest points to be consumed at one time may be set by the level of the target virtual user rather than being determined by the physical user operating the terminal 3.

As shown in FIG. 16, at first, in step S1601, the operation data receiving part 42 determines whether or not operation data that uses the quest point has been received. When the operation data that uses the quest point has not been received (S1601: NO), the program returns to step S1601, and when the operation data that uses the quest point has been received (S1601: YES), the process of the game server proceeds to step S1602.

In step S1602, the consumption point calculating section 43a calculates accumulated quest points consumed depending on the number of times the operation data is received, and then the process of the game server proceeds to step S1603. For example, when the operation data is received 8 times, as has been described above, since the quest points are consumed by "3 points" each time the operation data is received, the accumulated consumed quest points become "24". Also, the consumption point calculating section 43a notifies the data table update section 44 of the quest points consumed for each time the operation data is received. The data table updating section 44 updates the quest points of the target virtual user in the attribute data table 203 based on the information notified by the consumption point calculating section 43a. For example, when the target virtual user possesses "70" quest points and the operation data is received once, the data table update section 44 updates the quest points possessed by the target virtual user to "67 points", which is a reduction of "3 points" from "70 points".

In step S1603, the reach determining section 43b determines whether or not the accumulated quest points calculated by the consumption point calculating section 43a are greater than or equal to the points required for the target virtual user to reach the destination stage. For example, when the target virtual user moves from Stage St (2, 1) to Stage St (3, 1) (S1603: YES), the reached state determining section 43b determines that "24 points", which is the accumulated quest points, are greater than or equal to "23 points", which is the number of points required for reaching the destination stage as shown in the table of FIG. 14B. When the accumulated quest points are fewer than the points required for reaching (S1603: NO), the reached state determining section 43b returns to step S1601. When the accumulated quest points are greater than or equal to the number of points required for reaching (S1603: YES), the process of the game server proceeds to step S1604. Also, as has been described above, when the accumulated quest points are "24 points" and the required number of points is "23 points", the difference "1 point" can be assumed to have not been consumed, and the quest points of the target virtual user in the attribute data table 203 may be changed by the data table update section 44.

In step S1604, the reached state determining section 43b changes the stage where the target virtual user exists to the destination stage. Then, the data table updating section 44 is notified of the fact that the stage has changed.

In step S1605, the data table updating section 44 updates the identification data in the virtual position data table 202, and the process of the game server proceeds to step S1606. Specifically, the data table updating section 44 deletes the identification data of the target virtual user from the stage at which the target virtual user existed before the change, and adds the identification data of the target virtual user to the stage where the target virtual user exists after the modification.

In step S1606, the destination selection data transmitting section 45 determines whether or not the position where the target virtual user exists that is changed by the virtual position changing section 43 is the end position Fend of the target field. When it is the end position Fend (S1606: YES), the process of the game server proceeds to step S1607, and when it is not the end position Fend (S1606: NO), the process of the game server proceeds to step S1608.

In step S1607, the data table updating section 44 updates the identification data in the virtual position data table 202, terminates step S1203, which is the present process step, and the process of the game server proceeds to step S1204. Specifically, when the current target field is F(i), the data table updating section 44 updates the identification data of the target virtual user stored in the virtual position data table 203 in such a manner that the target field becomes F(i+1).

In step S1608, the destination selection data transmitting section 45 determines whether there is a plurality of stages that the target virtual user can reach from the current stage of the target virtual user, which has been changed by the virtual position changing section 43. For example, when the target virtual user exists at Stage St (2, 2) of the field F(i) shown in FIG. 14A, it is determined that there exists a plurality of reachable stages (S1608: YES), and the process of the game server proceeds to step S1609. When the target virtual user exists at a stage for which a plurality of reachable stages does not exist (S1608: NO), the process of the game server proceeds to step S1610.

In step S1609, the destination selection data transmitting section 45 transmits destination selection data for selecting the stage of the destination to the terminal 3 that operates the target virtual user, and step S1203, which is the present process step, is terminated and the process of the game server proceeds to step S1204.

Figure 17:
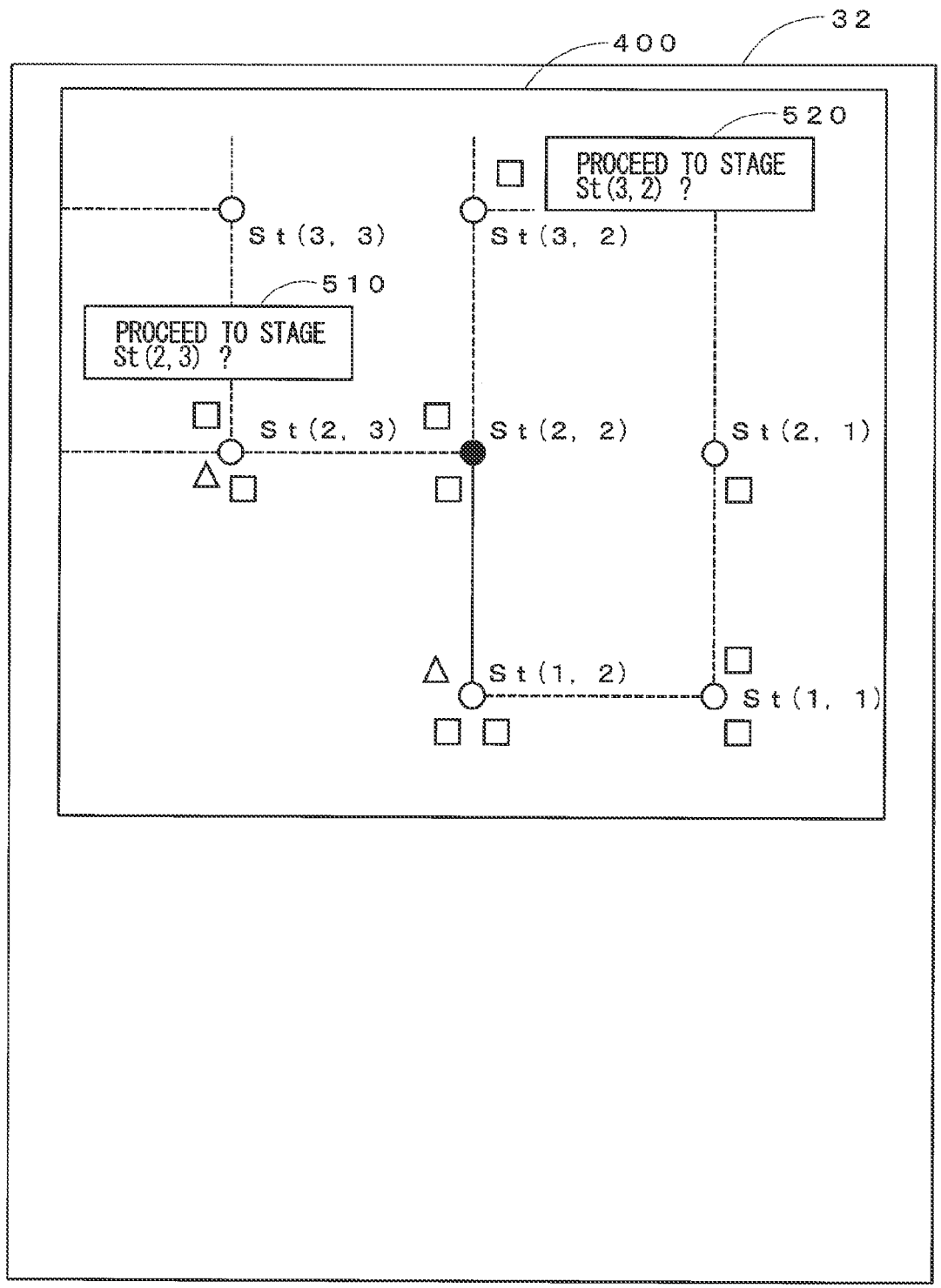
FIG. 17 is a diagram showing a specific example of a destination stage selection image displayed on a touch panel of the terminal.

For example, when the target virtual user exists at Stage St (2, 2) as shown in FIG. 17 (see black dot in FIG. 17), the destination selection data transmitting section 45 transmits selection image data 510 and 520 respectively representing stages St (3, 2) and St (2, 3), one of which is being selected as image data representing a stage to be selected as a destination. This selection image data 510, 520 may be incorporated in a map image 400 to be displayed on the terminal 3.

The terminal 3 which has received such selection image data 510, 520 displays these selection images on the display section 32. When one of the selection images is selected by the physical user operating the operation input section 33, the terminal 3 notifies the game server 1 of the fact that the destination stage has been determined via the wireless communication section 31.

In step S1610, the destination selection data transmitting section 45 determines the destination stage of the target virtual user, terminates step S1203 which is the present process step, and the process of the game server proceeds to step S1204. For example, when the target virtual user exists at Stage St (1, 1) in the field shown in FIG. 14A, the destination selection data transmitting section 45 determines Stage St (2, 1) as a destination stage.

(4-2) Process in Quest Part Processing Section of the Second Embodiment

Next, a process of the second embodiment of the quest part processing section 101 will be described with reference to FIG. 18.

In step S1801, the quest part processing section 101 determines whether or not the target field where the target virtual user exists is a "field already arrived at" which is a field at which the target virtual user has already arrived in the past.

When the target field is the "field already arrived at" (S1801: YES), the process of the game server proceeds to step S1803, and when the target field is not the "field already arrived at" (S1801: NO), the process of the game server proceeds to step S1802.

In step S1802, the quest part processing section 101 creates a two-dimensional map for the target field with a process similar to that of step S1201 of the first embodiment described above, and the process of the game server proceeds to step S1804.

In step S1803, the quest part processing section 101 re-creates a two-dimensional map for the field already arrived at for which a two-dimensional map has already been created, specifically in a manner described below, and the process of the game server proceeds to step S1804.

In step S1804, the quest part processing section 101 generates an event for a stage constituting a target field by the event generating section 50, specifically in a manner described below, and the process of the game server proceeds to step S1805.

In step S1805, the quest part processing section 101 performs a process of changing the position at which the virtual user exists in the target field with a process similar to that of S1203 of the first embodiment described above, and the process of the game server proceeds to step S1806.

In step S1806, the quest part processing section 101 determines whether or not the target virtual user has moved between the fields or whether or not a predetermined amount of time such as 24 hours has elapsed. When one of the conditions is satisfied (S1806: YES), the process of the game server proceeds to step S1807, and when neither condition is satisfied (S1806: NO), the program returns to step S1805.

In step S1807, the quest part processing section 101 determines whether or not termination of the process has been accepted. For example, as in maintenance activities, when the administrator who is managing the game server 1 changes the configuration of the field, a termination instruction for the process from the administrator is accepted. When the termination of the process is accepted, the present process step is terminated (S1807: YES). When there is no termination instruction for the process (S1807: NO), the program returns to step S1801.

(4-2-1) Process of Re-creating a Two-Dimensional Map (S1803)

Figure 19:
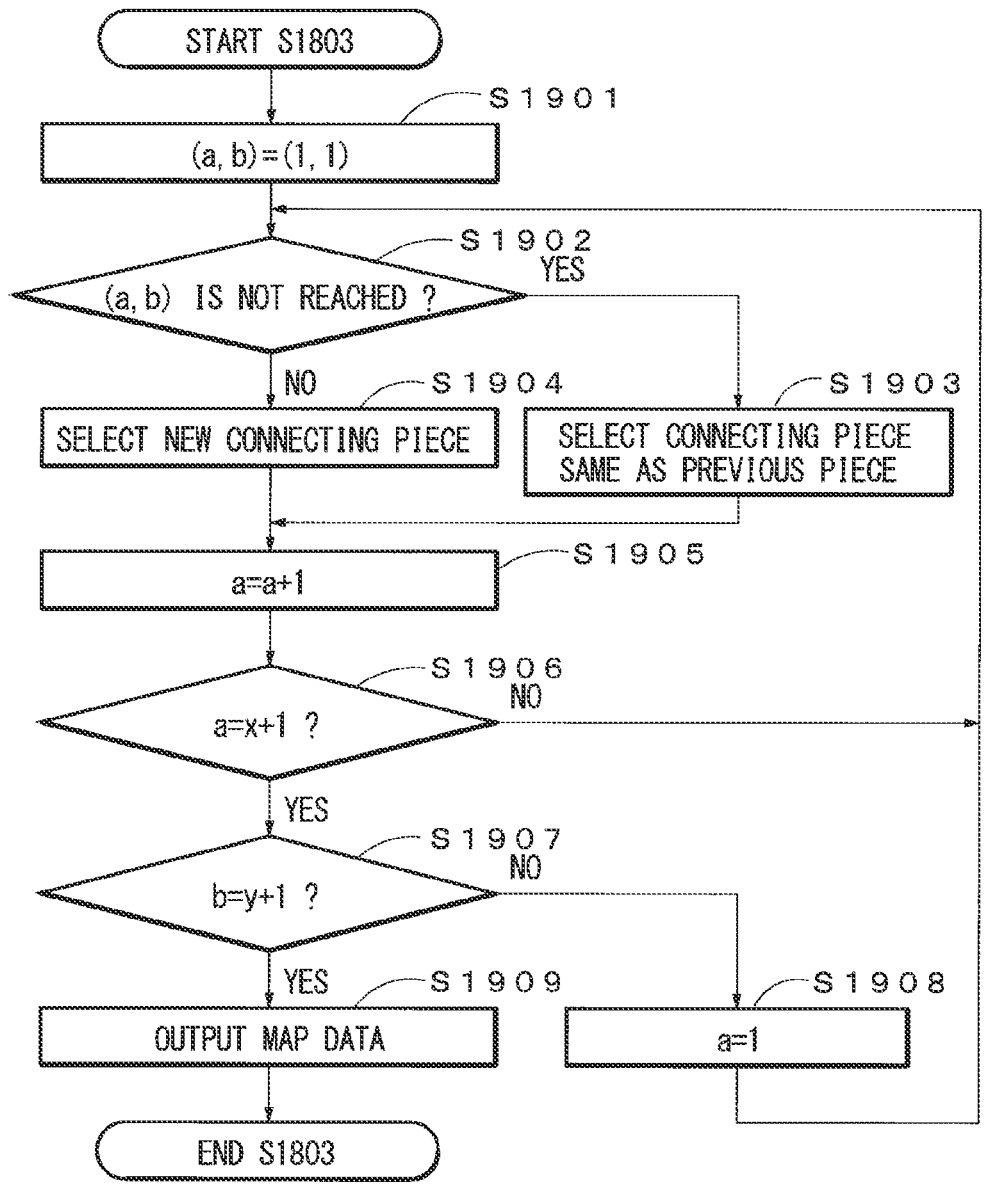
FIG. 19 is a flowchart for explaining a process of creating a two-dimensional map of the second embodiment.

As a specific process of step S1803, the process of re-creating a two-dimensional map will be described in accordance with a flowchart shown in FIG. 19.

In step S1803, similarly to S1201 of the first embodiment described above, the map creating section 40 creates a two-dimensional map by combining a total of six kinds of connecting pieces 401-406. Also, in this process, each field is constituted by blocks that are arranged into a matrix, 4 blocks vertically by 4 blocks horizontally. The position where each stage is located is specified with coordinates (a, b) of a two-dimensional orthogonal coordinate system.

In step S1901, the map creating section 40 sets the coordinates (a, b) of the target block in the target field to (1, 1), which is an initial value, and the process of the game server proceeds to step S1902.

In step S1902, the map creating section 40 determines whether the virtual user has not yet reached the target block at coordinates (a, b). When it is determined that it has not been reached (S1902: YES), the process of the game server proceeds to step S1903, and when it is determined that it has been reached (S1902: NO), the process of the game server proceeds to step S1904.

In step S1903, the map creating section 40 selects a connecting piece which is the same as the connecting piece previously selected for the target block and the process of the game server proceeds to step S1905. With this process, the map creating section 40 can maintain the connecting relationship between the target block and surrounding blocks for the cases in which the virtual user has previously arrived at the target field.

In step S1904, the map creating section 40 selects a new connecting piece corresponding to the target block from the piece storing section 40a, and the process of the game server proceeds to step S1905. Here, a new connecting piece may be any connecting piece, and preferably, it is a piece different from the piece that was selected when the virtual user previously arrived at the target field. In this manner, by selecting a piece different from the piece that was selected when the virtual user previously arrived at the target field, the connection relationship between the target block and the surrounding block can be changed efficiently.

In step S1905, the map creating section 40 updates the coordinates of the target block from (a, b) to (a+1, b), and the process of the game server proceeds to step S1906.

In step S1906, the map creating section 40 determines whether or not the variable "a" takes a value x+1. In other words, it is determined whether or not the target block is beyond a laterally defined edge of an outer boundary of the field. When the variable "a" does not take a value x+1 (S1906: NO), the program returns to step S1902, and when the variable "a" takes a value x+1 (S1906: YES), the process of the game server proceeds to step S1907.

In step S1907, the map creating section 40 determines whether or not the variable "b" takes a value y+1. In other words, it is determined whether or not the target block is beyond a longitudinally defined edge of an outer boundary of the field. When the variable "b" does not take a value y+1 (S1907: NO), the process of the game server proceeds to step S1908, and when the variable "b" takes a value y+1 (S1907: YES), the process of the game server proceeds to step S1909.

In step S1908, the map creating section 40 resets the value of the variable "a" to 1, and returns to step S1902. By resetting the value of variable "a" in this manner, the position of the target block defined in the lateral direction is reset to an initial position.

In step S1909, the map creating section 40 writes the map data corresponding to the created two-dimensional map into the map data storing section 202, and terminates S1803, which is the present process step.

By repeatedly performing the processes of steps S1902 to S1908, the map creating section 40 connects the already reached stages by combining new pieces while maintaining the connection between the stages where the virtual user has not reached.

Figure 20A:
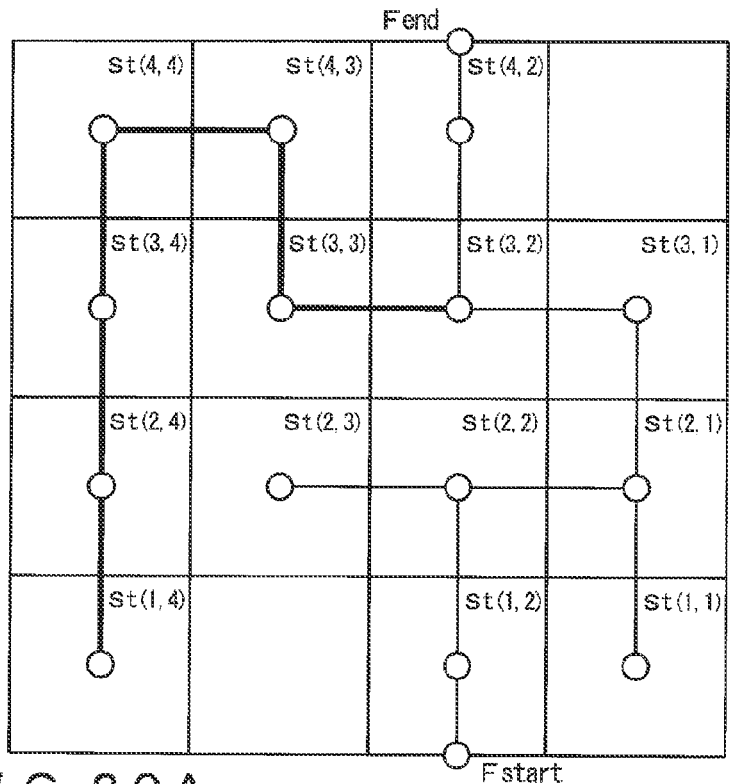
FIGS. 20A and 20B are diagrams for explaining a two-dimensional map created by the process of creating a two-dimensional map of the second embodiment and map data thereof.

For example, in an instance in which the virtual user has not yet reached the stages St (1, 4), St (2, 4), St (3, 3), St (3, 4), St (4, 3) and St (4, 4) in a two-dimensional map of field F(1) as shown in FIG. 7A, the map creating section 40 creates, for example, the following two-dimensional map in accordance with the process of step S1803. In other words, while maintaining the connection of the route between unreached stages which is indicated with a thick line in FIG. 20A, the map creating section 40 can change routes between other stages.

Figure 20B:
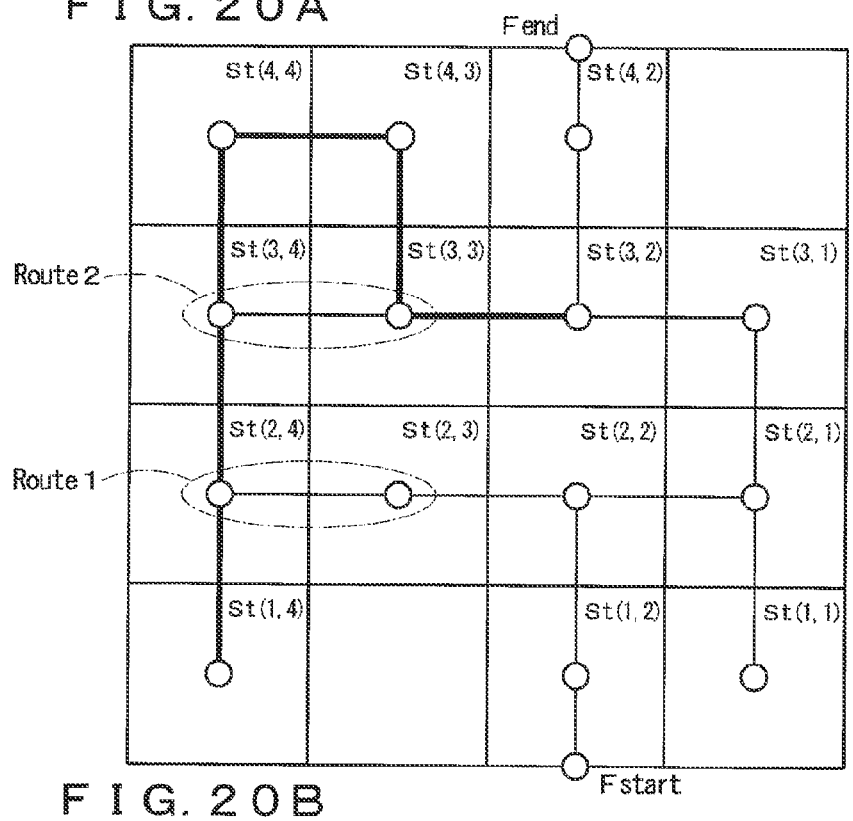

As a variant of the process of step S1803, when the connection of the route between unreached stages is maintained, the map creating section 40 may select a piece different from the piece used when the virtual user arrived at a previous target field, and, for example, the two-dimensional map as shown in FIG. 20B may be created. In the two-dimensional map of FIG. 20B, for example, for the stages St (2, 4) and St (3, 4) among the six unreached stages, by selecting pieces that are different from the previous pieces as indicated for Route 1 and Route 2, further different stages may be connected while maintaining the route between the unreached stages.

(4-2-2) Event Generating Process (S1804)

Figure 21:
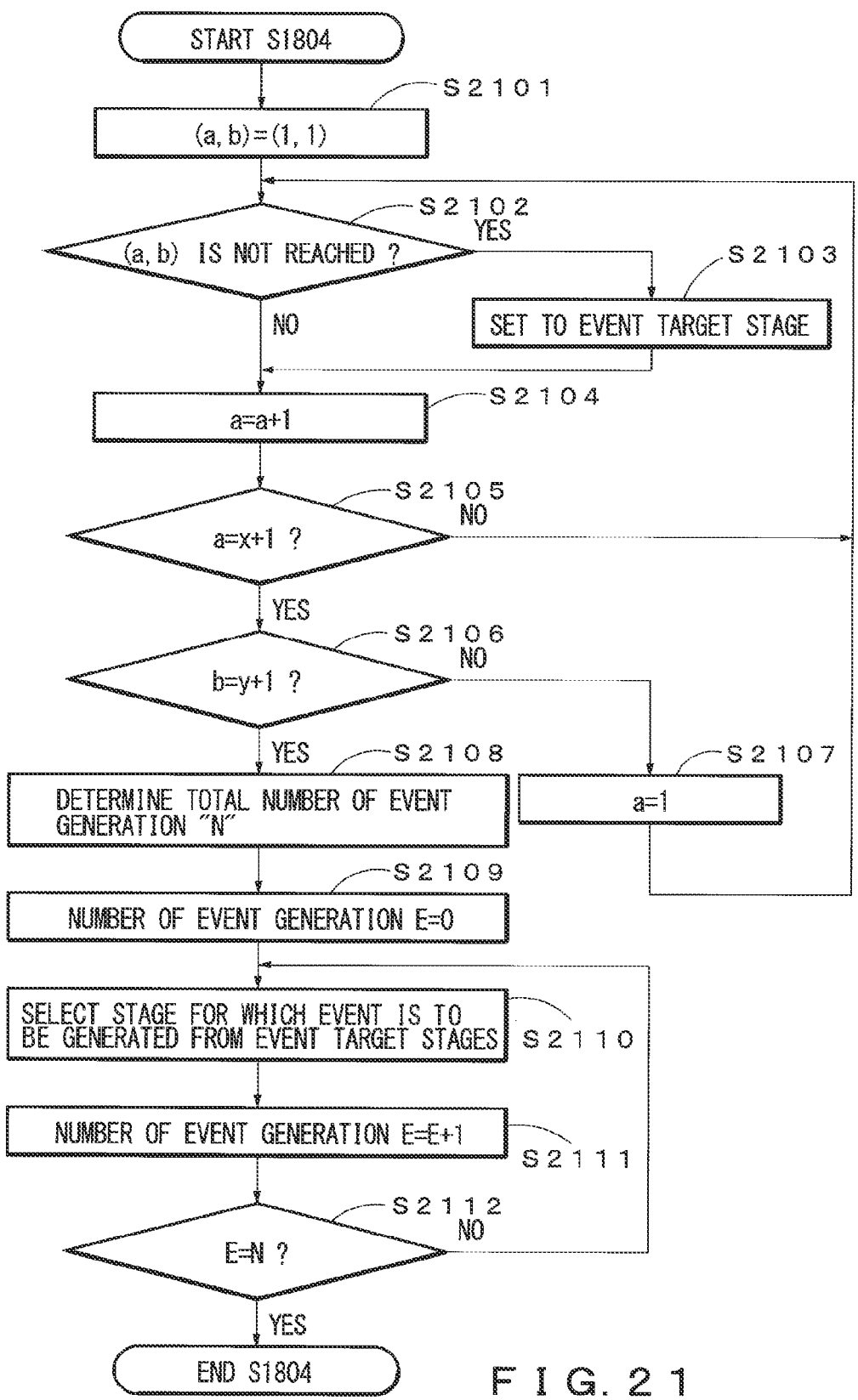
FIG. 21 is a flowchart for explaining an event generating process by an event generating section of the second embodiment.

Next, as a specific process content of step S1804, in the quest part processing section 101, the event generating section 40 generates an event which leads the virtual user, for example, in accordance with the process shown in FIG. 21, in order to prevent the virtual users from congregating on some of the stages in a newly created two-dimensional map.

In step S2101, the event generating section 50 sets the coordinates (a, b) of the target block of the target field to (1, 1), which is an initial value, and the process of the game server proceeds to step S2102.

In step S2102, the event generating section 50 determines whether or not the target block of the coordinates (a, b) has been reached. When it has not been reached (S2102: YES), the process of the game server proceeds to step S2103, and when it has been reached (S2102: NO), the process of the game server proceeds to step S2104.

In step S2103, the event generating section 50 sets the target block to an event target stage, and the process of the game server proceeds to step S2104.

In step S2104, the event generating section 50 updates the coordinates of the target block from (a, b) to (a+1, b), and the process of the game server proceeds to step S2105.

In step S2105, the event generating section 50 determines whether or not the variable "a" takes a value x+1. In other words, it determines whether or not the target block is beyond a laterally defined edge of an outer boundary of the field. When the variable "a" does not take a value x+1 (S2105: NO), the program returns to step S2102, and when the variable "a" takes a value x+1 (S2105: YES), the process of the game server proceeds to step S2106.

In step S2106, the event generating section 50 determines whether or not the variable "b" takes a value y+1. In other words, it determines whether or not the target block is beyond a longitudinally defined edge of an outer boundary of the field. When the variable "b" does not take a value y+1 (S2106: NO), the process of the game server proceeds to step S2107, and when the variable "b" takes a value y+1 (S2106: YES), the process of the game server proceeds to step S2108.

In step S2107, the event generating section 50 resets the value of variable "a" to 1, and returns to step S2102. By resetting the value of the variable "a" in this manner, the position of the target block defined in the lateral direction is reset to an initial position.

In step S2108, the event generating section 50 sets the total number of event generation N, and the process of the game server proceeds to step S2109. Here, the total number of event generation N may be determined based on the number of stages located in the field.

In step S2109, the event generating section 50 sets a number of event generation E to zero. The number of event generation E indicates a number of times a virtual event is generated, which is a chance of obtaining cards and items, and the process of the game server proceeds to step S2110.

In step S2110, the stage selecting section 51 selects a stage for which an event is to be generated from the event target stages set in step S2103. Also, the stage selecting section 51 notifies the generation processing section 52 of the selected stage. The generation processing section 52 causes an event for leading the virtual user to a certain route which will be generated in the selected stage by the stage selecting section 51, and the process of the game server proceeds to step S2111.

The data indicating the content of the event that was generated by the generation processing section 52 is stored in the map data storing section 202 as event data associated with the map data. Also, based on the event data stored in the map data storing section 202, the quest image transmitting section 41 transmits, to the terminal 3, display process data for displaying an announcement of an event.

In step S2111, the event generating section 50 updates the number of event generation E to E+1, and the process of the game server proceeds to step S2112.

In step S2112, the event generating section 50 determines whether or not the number of event generation E is equal to the total number of event generation N. When the number of event generation E is equal to the total number of event generation N (S2112: YES), the present process step is terminated, and when the number of event generation E is not equal to the total number of event generation N (S2112: NO), the program returns to step S2110.

In accordance with the aforementioned steps S2110 to S2112, the event generating section 50 generates an event for each stage.

In other words, in accordance with the aforementioned process, the generation processing section 52 preferentially produces events at stages the virtual user has not reached, i.e., stages St (1, 4), St (2, 4), St (3, 3), St (3, 4), St (4, 3) and St (4, 4). In this manner, the event generating section 50 can efficiently leading the virtual user to an unreached stage in which the connection relationship is maintained at the time the map is re-created.

When selecting the stage to be a target of event generation, the event generating section 50 is not limited to the method described above, and may also be performed with other selecting processes such as generating events by randomly selecting the stages. As an example of other selecting processes, for example, the stages that are not on the shortest route from a start position Fstart to an end positions Fend in field 400, or stages St (1, 1), St (2, 3), St (1, 4) that terminate in Field F (1) (see FIG. 20) may be preferentially selected and events may be generated. That is, as long as the virtual users can be prevented from being concentrated on a single stage and can be dispersed, the event generating section 50 may be a section that generates events at any virtual position for said purpose.

(5) Advantageous Effect

With the game server of the present embodiments described above, the virtual position where a virtual user can exist is located two dimensionally and stored as map data in the map data storing section 201 and by transmitting this data to the terminal 3, an image of the two-dimensional map can be displayed on the display section 32 of the terminal 3.

Thereby, when executing an action assigned to the virtual user at each virtual position, a plurality of virtual destination positions reachable by the virtual user can be provided.

Particularly, since the physical user can recognize this plurality of destinations by looking at the two-dimensional map on the terminal 3, a virtual region provided by the game part can be broadened visually as compared to the related art in which merely linear advancement was possible.

Also, in the present embodiment, since the map creating section 40 connects a route between the stages by combining the pieces to create a two-dimensional map by providing a change in a route connecting the stages that are reachable by the virtual user, various impressions can be provided to a physical user concerning the virtual space at which the virtual user exists, even though the virtual user is in the same virtual space.

In the present embodiment, since the map creating section 40 creates a two-dimensional map by connecting a route between the stages placed in the destination field, a field with a different route as compared to the field before the movement can be visually recognized by the physical user for every movement between the fields. Also, if the virtual user has returned to the field previously arrived at, the virtual user can move in the virtual space in which a route different from the route in the past is created. Thereby, a variety of impressions can be provided to a physical user regarding the stage where the virtual user exists.

In the present embodiment, when the virtual user has come back to the field previously arrived at, the map creating section 40 can maintain the connection relationship between the stages that have not been reached by the virtual user, and such a need can be satisfied even when the physical user wishes to move within the virtual space in the past state.

In the present embodiment, the map creating section 40 can easily divide the stages when creating a two-dimensional map and easily connect a route between the stages by using a matrix that equally divides the field into rectangular connecting pieces.

It is to be understood that the object of the present disclosure may also be accomplished by supplying a system or apparatus with a non-transitory storage medium in which a software program, which executes the functions of the above described embodiment, is stored and causing a computer (or CPU or MPU) of the system or apparatus to read out and execute the software program stored in the non-transitory storage medium.

In the above case, the software program read from the non-transitory storage medium executes the functions of the above described embodiment, and therefore the software program and the non-transitory storage medium in which the software program is stored are also an embodiment of the present disclosure.

Examples of the non-transitory storage medium for supplying the software program include a flexible disk, a hard disk, a magneto-optical disk, an optical disk such as a CD-ROM, a CD-R, a CD-RW, a DVD-ROM, a DVD-RAM, a DVD-RW and a DVD+RW, a magnetic tape, a nonvolatile memory card, and a ROM. Alternatively, the program may be downloaded via a network.

Further, it is to be understood that the functions of the above described embodiment may be accomplished not only by executing the software program read out by a computer, but also by causing an OS (operating system) or the like which operates on the computer to perform a part or all of the actual operations based on instructions of the software program.

Further, it is to be understood that functions of the above described embodiment may be accomplished by writing a software program read out from the non-transitory storage medium into a memory provided on an expansion board inserted into a computer or a memory provided in an expansion unit connected to the computer and then causing a CPU or the like provided in the expansion board or the expansion unit to perform a part or all of the actual operations based on instructions of the software program.

While the present disclosure has been described with reference to exemplary embodiments, it is to be understood that the present disclosure is not limited to the disclosed exemplary embodiments. The scope of the following claims is to be afforded the broadest interpretation so as to encompass all such modifications and equivalent structures and functions.

What is claimed is:

1. A game server comprising:
a virtual space information storing section that stores virtual space information representing a virtual space in which virtual positions where a virtual user can exist are arranged two-dimensionally;
a map creating section that creates a two-dimensional map by connecting a route between the virtual positions located in the virtual space represented by the virtual space information;
a virtual position data table that stores identification data of the virtual user existing at each of the virtual positions;
a display process data transmitting section that transmits display process data for displaying an image of the two-dimensional map to at least one terminal connected via a communication network;
an operation data receiving section that receives operation data from the terminal;
a virtual user position changing section that changes a first virtual position where the virtual user exists to a second virtual position when accumulated points consumed in accordance with a received content of the operation data are greater than or equal to points required for reaching the second virtual position from the first virtual position; and
a data updating section that updates the identification data of the virtual user existing at each of the virtual positions stored in the virtual position data table when the virtual position where the virtual user exists is changed,
the two-dimensional map created by the map creating section being formed by a plurality of types of polygon pieces obtained by dividing the two-dimensional map, each of the polygon pieces being provided with a route component extending from one edge of the polygon piece to at least one of the other edges of the polygon piece, the two-dimensional map being formed by combining the plurality of types of polygon pieces in such a manner that the route components on the polygon pieces are connected,
the map creating section creating a new two-dimensional map by maintaining a not-reached route connecting not-reached positions which the virtual user has not passed through and by combining the polygon pieces to connect already-reached positions which the virtual user has already reached.

2. The game server according to claim 1, wherein
the virtual space is divided into a plurality of layers, the plurality of the layers being connected in such a manner that the virtual user is movable between the layers; and
the map creating section creates a two-dimensional map of a destination layer by maintaining the not-reached route connecting not-reached positions which the virtual user has not reached and by combining the polygon pieces to connect already-reached positions which the virtual user has already reached, in a case where the virtual user moves between the layers.

3. The game server according to claim 1, wherein each of the polygon pieces is a rectangular piece obtained by dividing the two-dimensional map equally, the rectangular piece being provided with the route component extending from one edge of the rectangular piece to at least one of the other edges of the rectangular piece.

4. A game server comprising:
a virtual space information storing section that stores virtual space information representing a virtual space in which virtual positions where a virtual user can exist are arranged two-dimensionally;

a map creating section that creates a two-dimensional map by connecting a route between the virtual positions located in the virtual space represented by the virtual space information;

a virtual position data table that stores identification data of the virtual user existing at each of the virtual positions;

a display process data transmitting section that transmits display process data for displaying an image of the two-dimensional map to at least one terminal connected via a communication network;

an operation data receiving section that receives operation data from the terminal;

a virtual user position changing section that changes a first virtual position where the virtual user exists to a second virtual position when accumulated points consumed in accordance with a received content of the operation data are greater than or equal to points required for reaching the second virtual position from the first virtual position; and a data updating section that updates the identification data of the virtual user existing at each of the virtual positions stored in the virtual position data table when the virtual position where the virtual user exists is changed, the two-dimensional map created by the map creating section including a plurality of types of polygon pieces obtained by dividing the two-dimensional map, each of the polygon pieces being provided with a route component extending from one edge of the polygon piece to at least one of the other edges of the polygon piece, the two-dimensional map being formed by combining the plurality of types of polygon pieces in such a manner that the route components on the polygon pieces are connected, the map creating section creating the two-dimensional map by combining the polygon pieces after determining a congested virtual position based on unevenness of distribution of a number of virtual users existing on each virtual position and connecting the polygon pieces in such a manner that a total number of virtual positions connected on a first route through which a first movement is possible between predetermined virtual positions via virtual positions other than the congested virtual position is less than a total number of virtual positions connected to a second route through which a second movement is possible between the predetermined virtual positions via the congested virtual position.

5. The game server according to claim 4, wherein the map creating section sets a total number of virtual positions connected on a shortest route between the predetermined virtual positions in response to attribute data of the virtual user.

6. The game server according to claim 4, wherein each of the polygon pieces is a rectangular piece obtained by dividing the two-dimensional map equally, the rectangular piece being provided with the route component extending from one edge of the rectangular piece to at least one of the other edges of the rectangular piece.

7. A game controlling method executed by a computer connected to a communication network, the method comprising: causing the computer to execute a process including:

creating a two-dimensional map by retrieving virtual space information from a virtual space information storing section that stores the virtual space information representing a virtual space in which virtual positions where a virtual user can exist are arranged two-dimensionally, and connecting a route between the virtual positions located in the virtual space represented by the virtual space information;

transmitting data for displaying an image to at least one terminal connected via a communication network, the image representing at least one of the virtual positions where the virtual user can exist being arranged on the two-dimensional map in the virtual space;

receiving operation data from the terminal;

changing a first virtual position where the virtual user exists to a second virtual position, when accumulated points consumed in accordance with a received content of the operation data are greater than or equal to points required for reaching the second virtual position from the first virtual position; and updating identification data of the virtual user existing at each of the virtual positions stored in a virtual position data table when the virtual position where the virtual user exists is changed, the two-dimensional map being formed by a plurality of types of polygon pieces obtained by dividing the two-dimensional map, each of the polygon pieces being provided with a route component extending from one edge of the polygon piece to at least one of the other edges of the polygon piece, the two-dimensional map being formed by combining the plurality of types of polygon pieces in such a manner that the route components on the polygon pieces are connected, during the creation of the two-dimensional map, a new two-dimensional map is created by maintaining a not-reached route connecting not-reached positions which the virtual user has not reached and by combining the polygon pieces to connect already-reached positions which the virtual user has already reached.

8. A game controlling method executed by a computer connected to a communication network, the method comprising: causing the computer to execute a process including:

creating a two-dimensional map by retrieving virtual space information from a virtual space information storing section that stores the virtual space information representing a virtual space in which virtual positions where a virtual user can exist are arranged two-dimensionally, and connecting a route between the virtual positions located in the virtual space represented by the virtual space information;

transmitting data for displaying an image to at least one terminal connected via a communication network, the image representing at least one of the virtual positions where the virtual user can exist being arranged on the two-dimensional map in the virtual space;

receiving operation data from the terminal;

changing a first virtual position where the virtual user exists to a second virtual position, when accumulated points consumed in accordance with a received content of the operation data are greater than or equal to points required for reaching the second virtual position from the first virtual position; and updating identification data of the virtual user existing at each of the virtual positions stored in a virtual position data table when the virtual position where the virtual user exists is changed, the two-dimensional map including a plurality of types of polygon pieces obtained by dividing the two-dimensional map, each of the polygon pieces being provided with a route component extending from one edge of the polygon piece to at least one of the other edges of the polygon piece, the two-dimensional map being formed by combining the plurality of types of polygon pieces in such a manner that the route components on the polygon pieces are connected, during the creation of the two-dimensional map, the two-dimensional map is created by determining a congested virtual position based on unevenness of distribution of a number of virtual users existing on each virtual position and connecting the polygon pieces in such a manner that a total number of virtual positions connected on a first route through which a first movement is possible between predetermined virtual positions via virtual positions other than the congested virtual position is less than a total number of virtual positions connected to a second route through which a second movement is possible between the predetermined virtual positions via the congested virtual position.

9. A non-transitory computer-readable medium that stores a program, which when executed by a computer, causes the computer to:

create a two-dimensional map by retrieving virtual space information from a virtual space information storing section that stores the virtual space information representing a virtual space in which virtual positions where a virtual user can exist are arranged two-dimensionally, and connecting a route between the virtual positions located in the virtual space represented by the virtual space information;

transmit data for displaying an image to at least one terminal connected via a communication network, the image representing at least one of the virtual positions where the virtual user can exist being arranged on the two-dimensional map in the virtual space;

receive operation data from the terminal;

change a first virtual position where the virtual user exists to a second virtual position, when accumulated points consumed in accordance with a received content of the operation data are greater than or equal to points required for reaching the second virtual position from the first virtual position; and update identification data of the virtual user existing at each of the virtual positions stored in a virtual position data table when the virtual position where the virtual user exists is changed, the two-dimensional map being formed by a plurality of types of polygon pieces obtained by dividing the two-dimensional map, each of the polygon pieces being provided with a route component extending from one edge of the polygon piece to at least one of the other edges of the polygon piece, the two-dimensional map being formed by combining the plurality of types of polygon pieces in such a manner that the route components on the polygon pieces are connected, during the creation of the two-dimensional map, a new two-dimensional map is created by maintaining a not-reached route connecting not-reached positions which the virtual user has not reached and by combining the polygon pieces to connect already-reached positions which the virtual user has already reached.

10. A non-transitory computer-readable medium that stores a program, which when executed by a computer, causes the computer to:

create a two-dimensional map by retrieving virtual space information from a virtual space information storing section that stores the virtual space information representing a virtual space in which virtual positions where a virtual user can exist are arranged two-dimensionally, and connecting a route between the virtual positions located in the virtual space represented by the virtual space information;

transmit data for displaying an image to at least one terminal connected via a communication network, the image representing at least one of the virtual positions where the virtual user can exist being arranged on the two-dimensional map in the virtual space;

receive operation data from the terminal;

change a first virtual position where the virtual user exists to a second virtual position, when accumulated points consumed in accordance with a received content of the operation data are greater than or equal to points required for reaching the second virtual position from the first virtual position; and update identification data of the virtual user existing at each of the virtual positions stored in a virtual position data table when the virtual position where the virtual user exists is changed, the two-dimensional map including a plurality of types of polygon pieces obtained by dividing the two-dimensional map, each of the polygon pieces being provided with a route component extending from one edge of the polygon piece to at least one of the other edges of the polygon piece, the two-dimensional map being formed by combining the plurality of types of polygon pieces in such a manner that the route components on the polygon pieces are connected, during the creation of the two-dimensional map, the two-dimensional map is created by determining a congested virtual position based on unevenness of distribution of a number of virtual users existing on each virtual position and connecting the polygon pieces in such a manner that a total number of virtual positions connected on a first route through which a first movement is possible between predetermined virtual positions via virtual positions other than the congested virtual position is less than a total number of virtual positions connected to a second route through which a second movement is possible between the predetermined virtual positions via the congested virtual position.

11. A game system comprising:

a game server; and at least one terminal connected to the game server via a communication network, the game server including:

a virtual space information storing section that stores virtual space information representing a virtual space in which virtual positions where a virtual user can exist are arranged two-dimensionally;

a map creating section that creates a two-dimensional map by connecting a route between the virtual positions located in the virtual space represented by the virtual space information;

a virtual position data table that stores identification data of the virtual user existing at each of the virtual positions;

a display process data transmitting section that transmits display process data for displaying an image of the two-dimensional map to at least one terminal connected via a communication network;

an operation data receiving section that receives operation data from the terminal;

a virtual user position changing section that changes a first virtual position where the virtual user exists to a second virtual position when accumulated points consumed in accordance with a received content of the operation data are greater than or equal to points required for reaching the second virtual position from the first virtual position;

a data updating section that updates the identification data of the virtual user existing at each of the virtual positions stored in the virtual position data table when the virtual position where the virtual user exists is changed; and a destination selection data transmitting section that transmits, to the terminal, destination selection data for selecting the second virtual position when there are a plurality of virtual positions that can be reached from a virtual position where the virtual user exists, the two-dimensional map created by the map creating section including a plurality of types of polygon pieces obtained by dividing the two-dimensional map, each of the polygon pieces being provided with a route component extending from one edge of the polygon piece to at least one of the other edges of the polygon piece, the two-dimensional map being formed by combining the plurality of types of polygon pieces in such a manner that the route components on the polygon pieces are connected, the map creating section creating a new two-dimensional map by maintaining a not-reached route connecting not-reached positions which the virtual user has not reached and by combining the polygon pieces to connect already-reached positions which the virtual user has already reached, the terminal including:
  a display section that displays an image of the two-dimensional map using display process data received from the game server, and
  an operation input section that accepts operation input for selecting a destination virtual position from a virtual position indicated by destination selection data from the game server.

12. A game system comprising:

a game server; and at least one terminal connected to the game server via a communication network, the game server including:
  a virtual space information storing section that stores virtual space information representing a virtual space in which virtual positions where a virtual user can exist are arranged two-dimensionally;
  a map creating section that creates a two-dimensional map by connecting a route between the virtual positions located in the virtual space represented by the virtual space information;
  a virtual position data table that stores identification data of the virtual user existing at each of the virtual positions;
  a display process data transmitting section that transmits display process data for displaying an image of the two-dimensional map to at least one terminal connected via a communication network;
  an operation data receiving section that receives operation data from the terminal;
  a virtual user position changing section that changes a first virtual position where the virtual user exists to a second virtual position, when accumulated points consumed in accordance with a received content of the operation data are greater than or equal to points required for reaching the second virtual position from the first virtual position;
  a data updating section that updates the identification data of the virtual user existing at each of the virtual positions stored in the virtual position data table when the virtual position where the virtual user exists is changed; and
  a destination selection data transmitting section that transmits, to the terminal, destination selection data for selecting the second virtual position, when there are a plurality of virtual positions that can be reached from a virtual position where the virtual user exists, the two-dimensional map created by the map creating section including a plurality of types of polygon pieces obtained by dividing the two-dimensional map, each of the polygon pieces being provided with a route component extending from one edge of the polygon piece to at least one of the other edges of the polygon piece, the two-dimensional map being formed by combining the plurality of types of polygon pieces in such a manner that the route components on the polygon pieces are connected, the map creating section creating the two-dimensional map by determining a congested virtual position based on unevenness of distribution of a number of virtual users existing on each virtual position and connecting the polygon pieces in such a manner that a total number of virtual positions connected on a first route through which a first movement is possible between predetermined virtual positions via virtual positions other than the congested virtual position is less than a total number of virtual positions connected to a second route through which a second movement is possible between the predetermined virtual positions via the congested virtual position, the terminal including:
  a display section that displays an image of the two-dimensional map using display process data received from the game server, and
  an operation input section that accepts operation input for selecting a destination virtual position from a virtual position indicated by destination selection data from the game server.

* * * * *